(12) United States Patent
Gorman et al.

(10) Patent No.: US 7,052,639 B2
(45) Date of Patent: May 30, 2006

(54) WIRE WOUND TOOLING

(75) Inventors: Michael R. Gorman, Lake Elmo, MN (US); Robert D. Kampfer, Oakdale, MN (US); Thomas R. LaLiberte, Inver Grove Heights, MN (US)

(73) Assignee: 3M Innovative Properties Company

( * ) Notice: Subject to any disclaimer, the term of this patent is extended or adjusted under 35 U.S.C. 154(b) by 0 days.

(21) Appl. No.: 11/101,706

(22) Filed: Apr. 8, 2005

(65) Prior Publication Data

US 2005/0181179 A1    Aug. 18, 2005

Related U.S. Application Data

(62) Division of application No. 10/438,082, filed on May 14, 2003, now Pat. No. 6,902,389.

(51) Int. Cl.
*B29C 41/26* (2006.01)

(52) U.S. Cl. ............... 264/167; 264/210.2; 264/211.12

(58) Field of Classification Search ...................... None
See application file for complete search history.

(56) References Cited

U.S. PATENT DOCUMENTS

| | | |
|---|---|---|
| 133,454 A | 11/1872 | Kellogg |
| 2,008,597 A | 7/1935 | Schaffer |
| 2,108,013 A | 2/1938 | Fehr |
| 2,570,470 A | 10/1951 | Meyer et al. |
| 2,793,585 A | 5/1957 | Granitsas |
| 2,937,413 A | 5/1960 | Hollingsworth |
| 3,007,231 A | 11/1961 | Garver |
| 3,069,304 A | 12/1962 | Fahrbach et al. |
| 3,192,589 A | 7/1965 | Pearson |
| 3,312,583 A | 4/1967 | Rochlis |
| 3,387,338 A | 6/1968 | Kanai et al. |
| 3,541,216 A | 11/1970 | Rochlis |
| 3,594,863 A | 7/1971 | Erb |
| 3,594,865 A | 7/1971 | Erb |
| 3,718,959 A | 3/1973 | Sailas |
| 3,828,998 A | 8/1974 | Gross |
| 3,969,565 A | 7/1976 | Forrest |
| 4,084,302 A | 4/1978 | Aatinen |

(Continued)

FOREIGN PATENT DOCUMENTS

EP    0 811 331 A2    12/1997

(Continued)

*Primary Examiner*—Mark Eashoo
(74) *Attorney, Agent, or Firm*—William J. Bond

(57) ABSTRACT

Tool rolls and methods of using the tool rolls to manufacture articles with one or more structured surfaces are disclosed. The tool rolls include an outer surface that, when used in connection with materials of the proper viscosity or formability, can form a structured surface on an article. Because the tools are manufactured in roll-form, they can be advantageously used in continuous manufacturing processes. Alternatively, discrete articles may be processed using the tool rolls. The tool rolls are constructed of a cylindrical base roll and are wrapped with one or more continuous wires in a helical pattern. The wires are used, in essence, to form a structured surface on the tool roll that is the negative of the structured surface to be formed on the articles processed using the tool roll. One of the wires wound around the base roll may include depressions formed therein that, when wound in helical coils about the base roll, form cavities on the outer surface of the tool roll. Alternatively, the helical pattern of one or more wound wires may be used to form a continuous helical structured surface, e.g., a helical groove or grooves.

8 Claims, 15 Drawing Sheets

U.S. PATENT DOCUMENTS

| | | |
|---|---|---|
| 4,104,772 A | 8/1978 | Sailas |
| 4,104,773 A | 8/1978 | Sailas |
| 4,149,303 A | 4/1979 | Appenzeller |
| 4,192,050 A | 3/1980 | Appenzeller |
| 4,272,865 A | 6/1981 | Schmolke |
| 4,342,137 A | 8/1982 | Ennis et al. |
| 4,438,547 A | 3/1984 | Schmolke et al. |
| 4,537,096 A | 8/1985 | Hollingsworth |
| 4,775,310 A | 10/1988 | Fischer |
| 4,953,264 A | 9/1990 | Hollingsworth et al. |
| 5,077,870 A | 1/1992 | Melbye et al. |
| 5,100,512 A | 3/1992 | Waters |
| 5,554,333 A | 9/1996 | Fujiki |
| 5,620,769 A | 4/1997 | Wessels et al. |
| 5,792,411 A | 8/1998 | Morris et al. |
| 5,845,375 A | 12/1998 | Miller et al. |
| 5,887,470 A | 3/1999 | Mirtsch |
| 6,021,557 A | 2/2000 | Dais et al. |
| 6,190,594 B1 | 2/2001 | Gorman et al. |
| 2003/0111767 A1 | 6/2003 | Gorman et al. |

FOREIGN PATENT DOCUMENTS

| | | |
|---|---|---|
| JP | 55-158925 | 12/1980 |
| WO | WO 87/06522 | 11/1987 |
| WO | WO 97/46129 | 12/1997 |
| WO | WO 97/46130 | 12/1997 |
| WO | WO 98/14086 | 4/1998 |
| WO | WO 98/30381 | 7/1998 |
| WO | WO 98/31520 | 7/1998 |
| WO | WO 98/57564 | 12/1998 |
| WO | WO 98/57565 | 12/1998 |

WIRE WOUND TOOLING

CROSS REFERENCE TO RELATED APPLICATIONS

This application is a division of U.S. patent application Ser. No. 10/438,082, filed May 14, 2003, now U.S. Pat. No. 6,902,389.

FIELD OF THE INVENTION

The present invention relates to the field of manufacturing articles with structured surfaces. More particularly, the present invention provides tooling for manufacturing articles with one or more structured surfaces, methods of manufacturing the tooling, and methods of using the tooling to manufacture articles with one or more structured surfaces.

BACKGROUND

Articles with one or more structured surfaces find a variety of uses. The articles may be provided as films that exhibit, e.g., increased surface area, structures used to provide a mechanical fastener, optical properties, etc. When these films are manufactured for use as mechanical fasteners, the protrusions that are found on the structured surface are commonly referred to as hooks. The hooks may be formed in a curved shape or they may be substantially upright stems that are deformed to include, e.g., a head in the shape of mushroom.

Mechanical fasteners are sometimes designed so that two hook strips can be used to fasten two articles together by adhering each strip to one of the articles and then interengaging the two strips. Such a mechanical fastener is shown in U.S. Pat. No. 3,192,589 (Pearson) which calls the fastener "hermaphroditic" because its headed studs have both male and female characteristics when intermeshed. The Pearson fasteners can be made by molding a base from which integral headless studs project and then heat softening the tips of the studs.

U.S. Pat. No. 5,077,870 (Melbye et al.) discloses one method of manufacturing the hook strip portion of a mechanical fastener by forcing molten material into cavities formed in a moving mold surface. The stems formed by the moving mold surface are then capped to form the desired fasteners. The cavities are formed in the mold surface by drilling. As a result, the cavities are cylindrical in shape and, although some precision can be obtained in depth, diameter and spacing between cavities, it is obtained with some difficulty and increased costs. Furthermore, damage to the mold surface typically requires that the entire mold be discarded.

U.S. Pat. No. 5,792,411 (Morris et al.) discloses a molding tool manufactured by laser machining a mold surface. Molten material is then forced into the cavities in the moving mold surface to form stems. The stems are then capped to form the desired fasteners. Because the cavities are formed by laser ablation, the cavity shape is based on the energy distribution within the laser beam used to form the cavities. Furthermore, precise control over the depth of the cavities is difficult to obtain due to variability in the material used to construct the mold, the power of the laser beam, the energy distribution within the beam, beam focus, etc.

U.S. Pat. No. 4,775,310 (Fischer) and PCT Publication No. WO 97/46129 (Lacey et al.) disclose tooling used to manufacture hook strips for a hook-and-loop style mechanical fastener. The tools are formed by a hollow drum with a water cooling jacket. A series of mold disks or alternating mold disks and spacer plates are laminated together along the length of the drum to form the desired mold cavities on the face of the roll. Disadvantages of these designs include the cost of manufacturing the mold disks with adequate precision to ensure that the mold cavities are of the same depth, length, spacing, etc. Size limitations imposed on the disks by manufacturing difficulties can, in turn, limit line speed in processes using the tools. Other disadvantages of this design include non-uniform cooling of the mold cavities, non-uniformities in the products produced by the stacked plates, etc.

SUMMARY OF THE INVENTION

The present invention provides tool rolls and methods of using the tool rolls to manufacture articles with one or more structured surfaces. The tool rolls include an outer surface that, when used in connection with materials of the proper viscosity or formability, can form a structured surface on an article. Because the tools are manufactured in roll-form, they can be advantageously used in continuous manufacturing processes. Alternatively, discrete articles may be processed using the tool rolls of the present invention.

By "structured surface" it is meant that a surface of the article deviates from a planar or other smooth surface. For example, the structured surface may include protrusions extending therefrom, such as stems used in connection with mechanical fasteners. Other alternative structured surfaces include, but are not limited to: continuous grooves or ridges, elongated structures, etc.

The tool rolls of the present invention are constructed of a cylindrical base roll and are wrapped with one or more continuous wires in a helical pattern. The wires are used, in essence, to form a structured surface on the tool roll that is the negative of the structured surface to be formed on the articles processed using the tool roll. In one embodiment, at least one of the wires wound around the base roll may include depressions formed therein that, when wound in helical coils about the base roll, form mold cavities on the outer surface of the tool roll.

Advantages of the tool rolls according to the present invention include the ability to provide mold cavities with particularly small tangential cross-sectional areas. Also, feature dimensions of the depressions formed in the major sides of the wires may not be limited by, e.g., the thickness of the wire as with a wire including voids punched through both major sides. Mold cavities formed by depressions according to the present invention may be formed with depths that may extend over the entire side surfaces of the wires. As a result, protrusions may be formed using the tool roll that have a particularly high aspect ratio.

Filling of such high aspect ratio mold cavities may be enhanced by bleed structures on the wires and/or the base roll. Those bleed structures assist in the escape of air from the mold cavities during molding.

Another advantage of tool rolls according to the present invention is the density at which the mold cavities may be provided on the outer surface of the tool roll. By forming the mold cavities from depressions, structural integrity of the wire may be enhanced as compared to mold cavities formed by voids punched through both major sides of a wire. That enhanced structural integrity may allow for closer spacing of the mold cavities on the tool roll. The closer spacing of the mold cavities translates into increased density in the features that may be formed on articles manufacture using the tool roll.

Yet another advantage of tool rolls according to the present invention is that one or more depressions in a major side of the wire may be combined with a void formed through a wire to form a composite mold cavity having a shape that is not possible with a void or depressions alone.

Other advantages of the tool rolls include, but are not limited to the ability to replace the wire windings on the base roll if the outer surface of the tool roll becomes damaged or worn. The tool rolls may also be relatively inexpensive as compared to the cost of manufacturing tool rolls using, e.g., stacked plates or direct drilling of the mold surface.

Another advantage is the ability to control the spacing between mold cavities along the width of the roll by varying the thickness of the wire or wires wrapped around the base roll. Spacing of the mold cavities about the circumference can also be independently controlled by controlling the spacing between depressions in the wire or wires wrapped around the base roll. A further advantage is that, by controlling the profile or cross-sectional shape of the wire or wires and the shape or shapes of the depressions formed in the wire, variations in the shape or shapes of the mold cavities can also be achieved.

Yet another advantage of the present invention is the relatively small thermal mass of the wire or wires wrapped around the base roll in comparison to the thermal mass of the base roll. As a result, thermal control over the mold cavities can be improved, which can result in corresponding improvements in the uniformity of the products produced using the tool rolls.

As used in connection with the present invention, a "mold cavity" may be any discontinuity in an otherwise smooth or planar surface into which moldable material may flow during a molding process. In some embodiments of the present invention, the tool rolls may include mold cavities with high aspect ratios as defined below, although it should be understood that a mold cavity need not have a high aspect ratio.

In one aspect, the present invention provides a tool roll with a cylindrical base roll and a first wire having an inner edge, outer edge, and first and second major sides located therebetween. The first major side of the first wire includes a plurality of depressions formed therein and the first wire is wound in helical coils around the base roll such that the inner edge is proximate the base roll. The plurality of depressions in the first major side of the first wire form a plurality of mold cavities with each of the mold cavities including a mold opening at an outer surface of the tool roll proximate the outer edge of the first wire.

In another aspect, the present invention provides a tool roll including a cylindrical base roll and a first wire with an inner edge, outer edge, and first and second major sides located therebetween. The first major side of the first wire includes a plurality of depressions formed therein and the first wire is wound in helical coils around the base roll such that the inner edge is proximate the base roll. The plurality of depressions in the first major side of the first wire form a plurality of mold cavities with each of the mold cavities including a mold opening at an outer surface of the tool roll proximate the outer edge of the first wire. The tool roll also includes a second wire with an inner edge, outer edge, and first and second major sides located therebetween. The second wire is wound in helical coils around the base roll such that the inner edge of the second wire is proximate the base roll, wherein the second wire is located between adjacent helical coils of the first wire. The first major side of the second wire includes a bleed structure formed therein and an edge zone free of the bleed structure.

In another aspect, the present invention provides a tool roll including a cylindrical base roll and a first wire with an inner edge, outer edge, and first and second major sides located therebetween. The first wire is wound in helical coils around the base roll such that the inner edge is proximate the base roll. The first wire also includes a plurality of depressions formed in the first major side of the first wire and a plurality of voids formed through the first and second major sides of the first wire, wherein each of the voids includes a depression extending therefrom. The plurality of voids with depressions extending therefrom form a plurality of composite mold cavities with each of the composite mold cavities having a mold opening at an outer surface of the tool roll proximate the outer edge of the first wire.

In another aspect, the present invention provides a tool roll including a cylindrical base roll and a first wire with an inner edge, outer edge, and first and second major sides located therebetween, wherein the first wire is wound in helical coils around the base roll such that the inner edge is proximate the base roll. The first wire also includes a plurality of depressions formed in the first major side of the first wire. The tool roll further includes a second wire with an inner edge, outer edge, and first and second major sides located therebetween, wherein the second wire is wound around the base roll such that the second wire is located between adjacent helical coils of the first wire. The second wire includes a plurality of voids formed through the first and second major sides of the second wire. The plurality of depressions in the first wire and the plurality of voids in the second wire form a plurality of composite mold cavities, wherein each of the composite mold cavities includes at least one void of the plurality of voids, at least one depression of the plurality of depressions, and a mold opening at an outer surface of the tool roll proximate the outer edges of the first and second wires.

In another aspect, the present invention provides a method of forming a structured surface on an article, the method including providing a tool roll according to the present invention, contacting a moldable material to the outer surface of the tool roll to form the structured surface using the outer surface of the tool roll, wherein the moldable material at least partially fills at least some of the mold cavities or composite mold cavities; and removing the structured surface from the outer surface of the tool roll, wherein the structured surface includes a plurality of protrusions corresponding to the plurality of mold cavities or composite mold cavities.

In another aspect, the present invention provides an article including a base surface, a plurality of elongated ridges protruding from the base surface, and a plurality of ears protruding from each elongated ridge of the plurality of elongated ridges.

These and other features and advantages of the present invention are described below in connection with illustrative embodiments of the present invention.

BRIEF DESCRIPTION OF THE DRAWINGS

FIG. 18 is a cross-sectional view of wire 920 in FIG. 17 taken along line 18—18, depicting a void in wire 920 and a depression in adjacent wire 940a.

DETAILED DESCRIPTION OF ILLUSTRATIVE EMBODIMENTS OF THE INVENTION

The present invention provides tool rolls and methods of using the tool rolls to manufacture articles with one or more structured surfaces. The tool rolls include an outer surface that, when used in connection with materials of the proper viscosity or formability, can form a structured surface on an article. Because the tools are manufactured in roll-form, they can be advantageously used in continuous manufacturing processes to form e.g., films, sheets, etc. Alternatively, discrete articles may be processed using the tool rolls of the present invention.

The tool rolls of the present invention may include mold cavities in their outer surfaces that, when used in connection with materials of the proper viscosity or formability, can form protrusions or structures on at least one surface of a film. Alternatively, two such rolls can be used in combination to form a film in which both major surfaces exhibit protrusions or structures.

Figure 1:
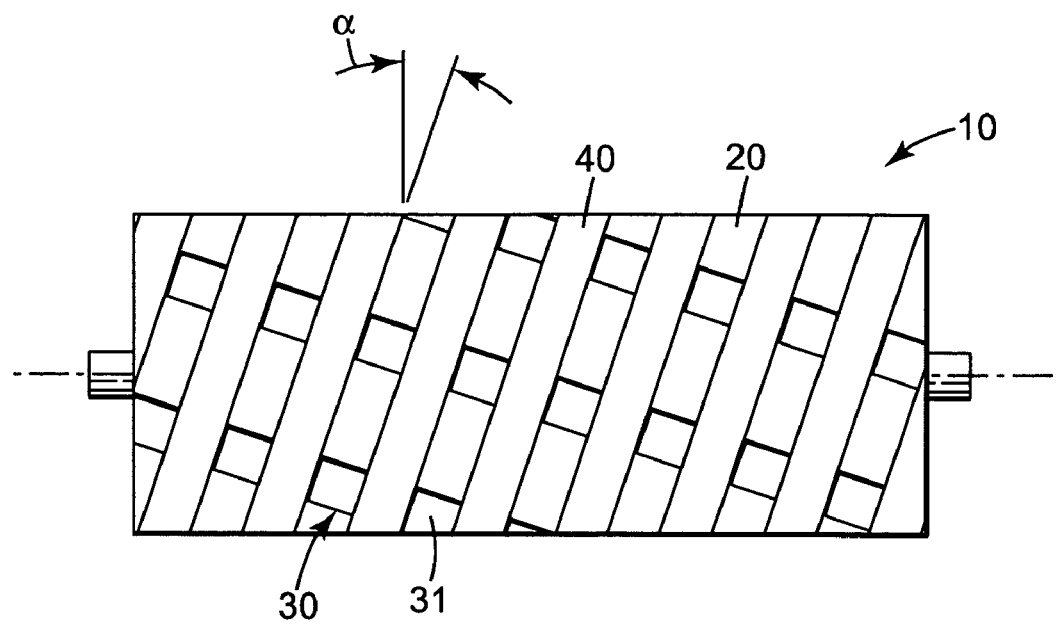
FIG. 1 is a plan view of one tool roll including cavities formed therein according to the present invention.
Figure 2:
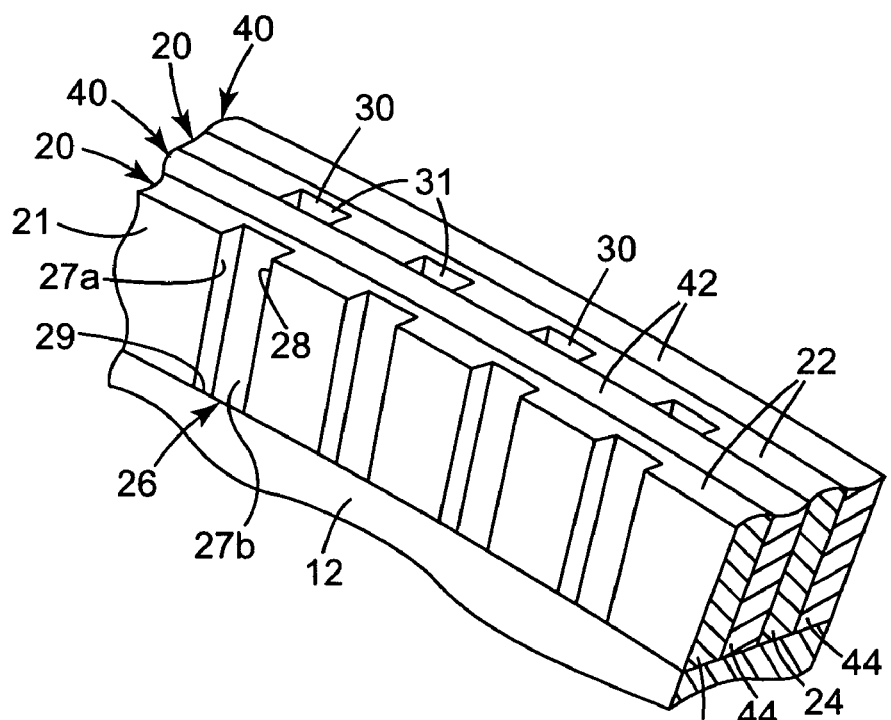
FIG. 2 is an enlarged cut-away perspective view of a portion of the surface of the tool roll of FIG. 1 illustrating the cavities formed therein.

FIG. 1 depicts one illustrative embodiment of a tool roll 10 according to the present invention including mold cavities 30 opening into an outer surface of the tool roll 10. FIG. 2 illustrates an enlarged partial cut-away view of the surface of the tool roll 10 of FIG. 1. The tool roll 10 preferably includes a cylindrical base roll 12 around which one or more wires are wrapped in the shape of a helical coil to produce a surface having mold cavities 30 formed therein.

The wire or wires wrapped around the base roll 12 may be held in place by any suitable mechanism, including, but not limited to clamps, welding, adhesives, etc. Such techniques are known in the production of, e.g., carding rolls. See, e.g., U.S. Pat. No. 4,272,865 (Schmolke).

Figure 1A:
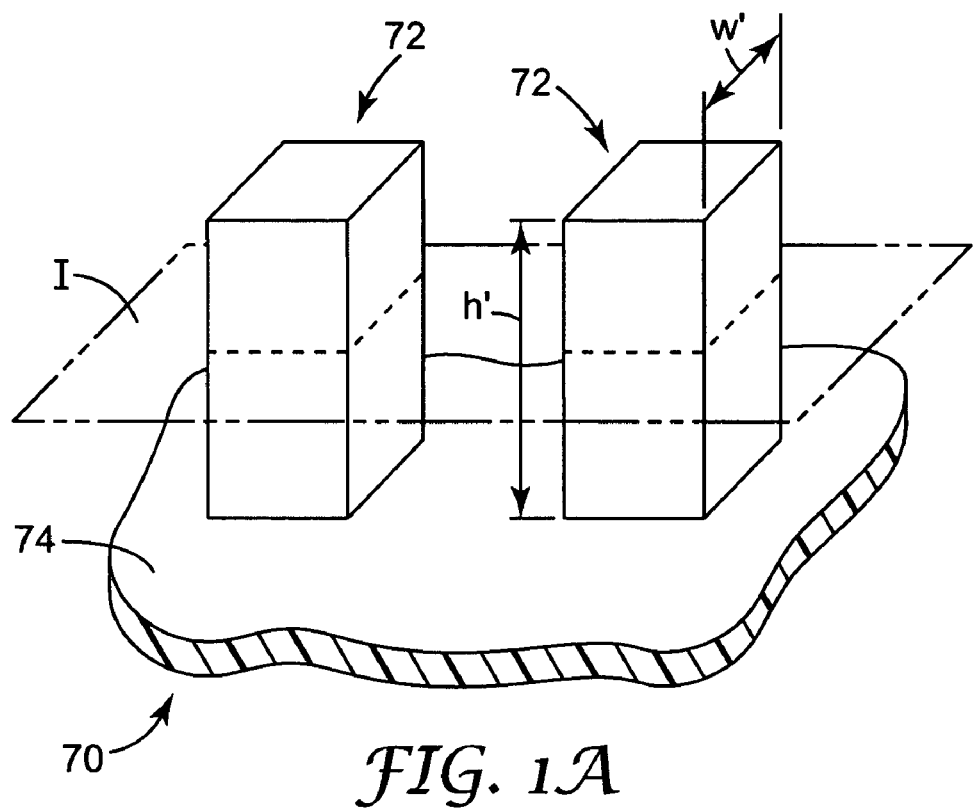
FIG. 1A is an enlarged perspective view of a structured surface formed using a tool roll according to the present invention.

One preferred application in which tool rolls manufactured according to the present invention such as tool roll 10 may be used is in the production of high aspect topology structured surfaces. Referring to FIG. 1A, one illustrative article 70 formed using tool roll 10 is depicted including a structured surface having protrusions 72 formed thereon. The illustrated protrusions have a height h' above the surface 74 of the article 70 and a minimum width w' measured in a plane I generally parallel to the plane of the surface 74. If the surface 74 has some curvature, the plane I is preferably oriented tangential to the surface 74 in the area of the protrusion 72.

The protrusions 72 may have a high aspect ratio and the tool rolls according to the present invention may be particularly advantageous in the manufacturing of structured surfaces with high aspect ratio topologies. By "high aspect ratio" it is meant that the ratio of protrusion height to minimum width (h':w') at the base of the protrusion 72 proximate surface 74 is, e.g., at least about 2:1 or higher, more preferably about 3:1 or higher, and even more preferably at least about 5:1 or higher. In addition to, or in place of, high aspect ratio as defined above, it may be preferred that the protrusion or structure height h' above the major surface of the article be, e.g., about 0.1 millimeters or more, more preferably about 0.2 millimeters or more, and even more preferably about 0.4 millimeters or more.

Figure 1B:
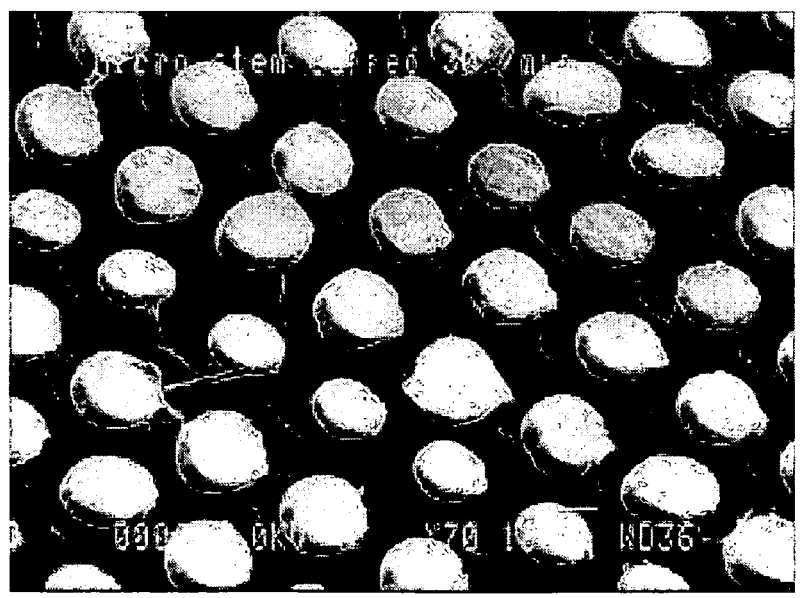
FIG. 1B is a photomicrograph of one article with protrusions formed thereon with the protrusions having been capped after formation.

FIG. 1B is an enlarged perspective photomicrograph of a portion of one exemplary article manufactured according to the principles of the present invention. The article, which may be provided in sheet or film form, includes protrusions that have been capped after formation with a tool in accordance with the present invention. Such articles may advantageously be used as mechanical fasteners (e.g., mushroom-type or hook-type mechanical fasteners). If the article is used as a mechanical fastener, the protrusions may commonly be referred to as stems, although use of that term is not intended to limit the scope of use for the articles manufactured using the present invention.

Although the articles that can be produced by tool rolls and methods of the present invention are advantageously used as mechanical fasteners, the articles may find a variety of other uses and the tool rolls and methods of using the tool rolls to manufacture articles with structured surfaces according to the present invention should not be limited to the field of mechanical fasteners. For example, the protrusions formed on the structured surface of an article according to the present invention may provide advantages in retaining adhesives or other coatings/materials by, e.g., increasing the surface area of the film. The structured surfaces formed by the tool rolls may also be useful for decorative purposes, as flow channels, drag reduction structures, abrasive backings, etc.

The helical nature of the wrapped wires is illustrated in FIG. 1. The coils are preferably oriented at a helix angle α (alpha) relative to a reference line that is normal to the surface of the cylindrical tool roll 10. As a result of the helical nature of the wrapped wires, they progress across the surface of the roll 10 from one end to the opposite end. The helix angle α (alpha) is preferably rather small, e.g., about 5 degrees or less, although larger helix angles could be used. Smaller helix angles will typically result in smaller spacing between the mold cavities along the longitudinal axis 11 of the tool roll 10. Alternatively, the wires may be wrapped around the roll in an undulating helical pattern as described, e.g., in U.S. Pat. No. 6,767,202.

The illustrated tool roll 10 is manufactured using a cylindrical base roll 12 around which a continuous wire 20 including depressions 26 and a spacer wire 40 are wound. The result is that alternating helical coils of wire 20 with depressions 26 and spacer wire 40 are disposed over the surface of the tool roll 10. The inner edges 24 of the wire 20 and the inner edge 44 of the spacer wire 40 are wrapped around the base roll 12 while the outer edges 22 and 42 of the wires 20 and 40, respectively, are wound facing outward from the base roll 12. Both the wire 20 and the spacer wire 40 may preferably have rectangular cross-sections compatible with an even progression of the helical coils across the roll 10.

The wire 20 includes two major sides extending between the inner edge 24 and the outer edge 22 of the wire 20. Although the wire 20 includes generally flat major sides, the major sides of wires used in connection with the present invention may take any suitable form. Some examples of wires that include a variety of surfaces that, together form a major side extending from an inner edge to an outer edge of a wire can be seen in FIGS. 8A–8D.

The depicted depressions 26 provided in a first major side 21 of wire 20 include opposing side walls 27a, 27b, and 28, and bottom 29 as seen in FIG. 2. As used herein, the term "depression" is defined as a variation in a surface such that when the surface with the depression formed therein is placed against a complementary surface without a depression, the depression forms a mold cavity. For example, a depression may be a void or divot formed in the surface by displacing and/or removing material such that the thickness of the structure orthogonal to the surface varies across the surface. Depressions of the present invention do not extend through the opposing major sides of the wires.

Although depicted in FIG. 1 as having depressions formed in first major side 21 of wire 20, the present invention may further include wires 20 having depressions formed in both the first major side 21 and the second opposing major side.

It may be preferred, but not required, that each of the depressions 26 be of the same size and be evenly-spaced along the length of the wire 20 to provide uniformity in the spacing of the resultant mold cavities 30. It may further be preferred that the outer edge 22 of the coils of wire 20 is even with the outer edge 42 of the spacer wire 40 such that the areas between the mold cavities 30 in the finished tool roll 10 are substantially smooth, i.e., without significant discontinuities between the wires 20 and 40.

Alternatively, the outer edges 22 and 42 of the wires 20 and 40, respectively, may be located at different heights above the surface of the base roll 12. Wires 20 and 40 with different heights can impart a structure to the surface of the article being manufactured. That structure may be in the form of elongated ridges that may provide reinforcement to, e.g., taller protrusions formed by the mold cavities and/or the article itself.

The wire 20, including depressions 26 formed therein that provide the desired mold cavities 30 when wound around the base roll 12 as discussed above, may preferably be manufactured using a wire or strip having a generally rectangular cross-section. Wire 20 may be manufactured with the depressions 26 or a wire with a substantially uniform profile may first be manufactured and then processed by any suitable technique or techniques to form the depressions 26 therein. The suitable technique or techniques may include, but not limited to knurling, stamping, embossing, engraving, conventional machining, laser machining, electronic discharge machining, water jet machining, etching, photolithography, etc. The wire 20 may be manufactured from any suitable material or materials, although some preferred materials include steels, more preferably medium to low carbon steels.

Figure 3A:
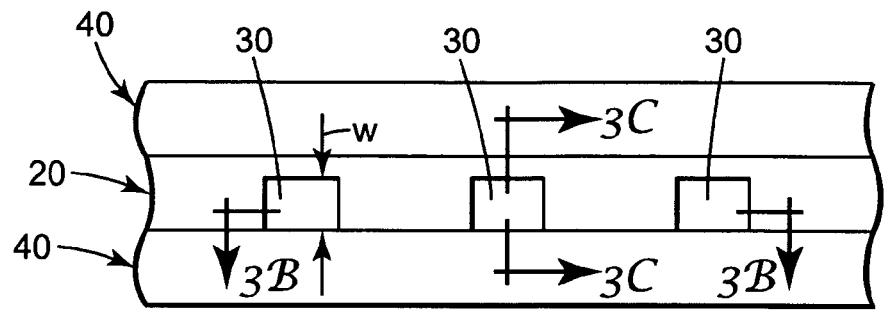
FIG. 3A is an enlarged plan view of the surface of the tool roll of FIG. 1.
Figure 3B:
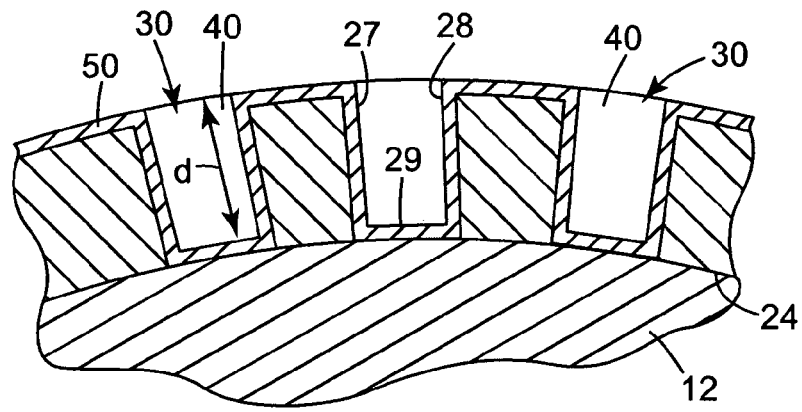
FIG. 3B is a cross-sectional view of FIG. 3A taken along line 3B—3B.
Figure 3C:
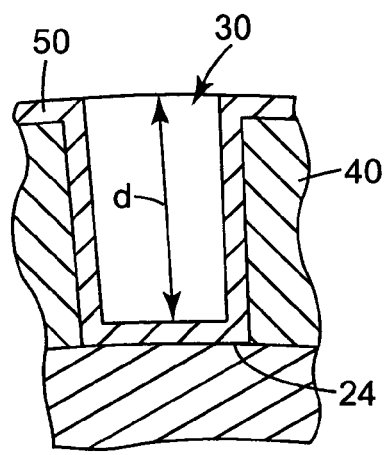
FIG. 3C is a cross-sectional view of FIG. 3A taken along line 3C—3C.

The mold cavities 30 illustrated in FIGS. 1 & 2, which each include a mold opening 31, have substantially uniform cross-sectional areas along their depth from the opening at the surface of the tool roll 10 to the mold cavity bottoms 29. The mold cavity bottoms 29 are formed by the mold cavity 26 and an outer surface of the cylindrical base roll 12. FIG. 3A is an enlarged plan view of a few mold cavities 30 and FIGS. 3B and 3C are cross-sectional views of the mold cavities 30 along lines 3B—3B and 3C—3C, respectively. The mold cavities 30 may exhibit generally rectilinear tangential cross-sectional areas along their depths d. By tangential, it is meant that the cross-section is taken along a tangent to the roll 10. By rectilinear, it is meant that the shape of the mold cavity 30 in the tangential cross-section is formed by substantially planar sides. The illustrated cavities 30 are also oriented substantially along the radius of the roll 10, although various orientations are possible as discussed below.

Sides 27a, 27b, and 28 of the mold cavities 30 may be parallel or they may be formed with a draft angle such that sides 27a and 27b are farther apart at the openings of the mold cavities 30 than at the bottoms of the mold cavities 30 or vice versa.

In addition to controlling the shape of the depressions formed in the major side of a wire, the present invention also provides control of the depth of the depressions into the major side of the wire such that the width of the protrusions (e.g., width w' of FIG. 1A) formed may be adjusted. The depth w of a mold cavity 30 into the major side of the wire 20 is seen in FIG. 3A.

In those instances, however, where the mold cavities have non-uniform shapes, e.g., the cavities are formed in the shape of hook or other structure, the "bottom" of the mold cavity is defined as the portion of the mold cavity that is closest to the outer surface of the cylindrical base roll. One example of such a mold cavity is illustrated in FIG. 6C where the mold cavity 230c has a bottom 229c closest to an outer surface 230c of the cylindrical base roll 212. Furthermore, the depth $d_c$ of the mold cavity 230c is also defined by the bottom 229c of the mold cavity 230c. The mold cavity 230c has an end 231c that is distinguishable from its bottom 229c because the mold cavity 230c turns away from the inner edge 224c of the wire 220c.

Although the bottoms of the various illustrative mold cavities described above are formed by the base rolls, it should be understood that the depressions may terminate above the surface of the base roll, such that the bottom of the mold cavity is formed within the surface in which the depression is formed.

One advantage of tool rolls manufactured according to the present invention as compared to tool rolls manufactured according to the teachings of U.S. Pat. No. 6,190,594 B1 (Gorman) and U.S. Pat. No. 6,767,202 is that by using depressions formed in a surface of the wire to define the mold cavities, the mold cavity density may be substantially increased. The increased mold cavity density may be possible because of the ability to provide smaller mold cavities and to space the mold cavities closer together along the length of the wire.

Tool rolls manufactured according to the present invention may include a density of at least 50 cavities per $cm^2$ or more. It may be preferred that the tool roll 10 include a density of at least 100 cavities per $cm^2$ or more. It may be more preferred that the tool roll 10 include a density of at least 500 cavities per $cm^2$ or more.

The size of the mold cavity openings at the surface of the tool may be relatively small in relation to, e.g., the thickness of the wire. For example, the tangential cross-sectional area of the mold cavity openings may be 0.1 $cm^2$ or smaller, in some instances 0.02 $cm^2$ or smaller.

The preferred cylindrical base rolls 12 are precision formed to have tightly controlled runouts. That precision runout, in combination with a tightly controlled height dimension h in the wires 20 can provide mold cavities 30 with substantially uniform depths d as measured from the outer surface of the roll 10. The tolerances to which the height dimension h can be controlled will generally be relatively small and the runout of the base roll 12 can be tightly controlled, resulting in overall tight tolerance control in the finished tool roll 10.

The mold cavities 30 can also be characterized in terms of aspect ratio as discussed above in connection with protrusions 72 on article 70 in FIG. 1A. The aspect ratio of the mold cavities 30 will be determined based on the depth d as compared to the minimum width w (see FIG. 3A) of the mold cavities, where the minimum width w is measured in a plane tangential to the surface of the base roll 12 at the opening of the mold cavity. In other words, the aspect ratio of the mold cavities 30 is d:w and, where the tool roll 10 is to be used to manufacture articles having a structured surface with high aspect ratio topology, it may be preferred that the ratio d:w be, e.g., at least about 2:1 or higher, more preferably at least about 3:1 or higher, and even more preferably at least about 5:1 or higher. In addition to, or in place of, high aspect ratio as defined above, it may be preferred that the mold cavity depth d be, e.g., about 0.1 millimeters or more, more preferably about 0.2 millimeters or more, and even more preferably about 0.4 millimeters or more.

FIGS. 3B and 3C illustrate another optional feature of the invention, namely the optional addition of a plating or other coating 50 on the roll 10. The illustrated coating 50 is located over the entire outer surface of the tool roll 10, i.e., the areas between the mold cavities 30 as well as on the inner surface of the mold cavities 30. Alternatively, the coating could be located only on the outer surface of the roll 10 and absent from the inner surfaces of the cavities 30. In another alternative, the coating 50 could be located only in the cavities 30 and not on the outer surface of the roll 10. In still another alternative, a first coating could be located in the mold cavities 30 and a second coating could be located on the outer surface of the tool roll 10.

Although the coating 50 is illustrated as a homogenous layer, it should be understood that coating 50 may actually be a combination of one or more materials intermixed or applied in successive layers. The material or materials used in coating 50 may vary depending on the desired physical properties. Some physical properties that may be desired include, but are not limited to increased wear resistance, controlled release characteristics, controlled surface roughness, bonding between adjacent wire windings, etc. Some preferred materials may be metal platings, more particularly an electroless nickel plating, chrome, etc.

Figure 4:
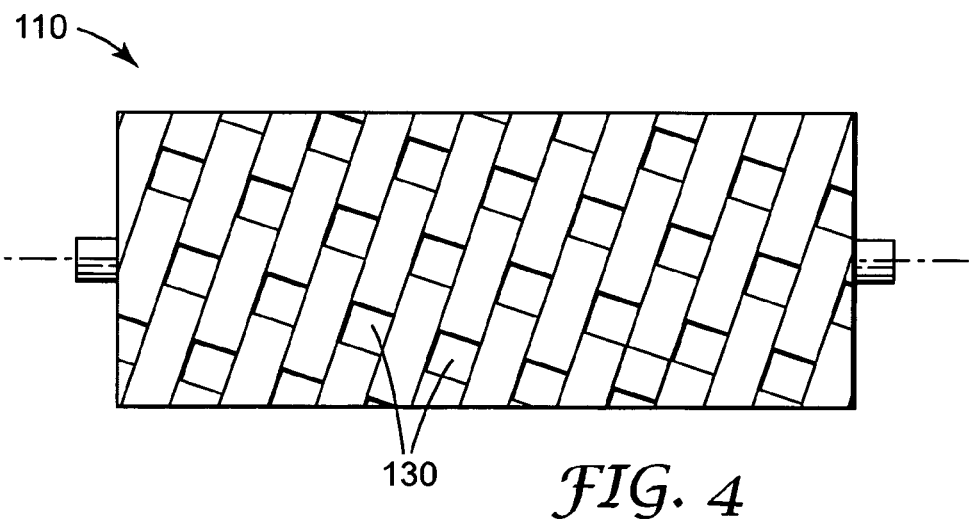
FIG. 4 is a plan view of another tool roll including cavities formed therein according to the present invention.
Figure 5:
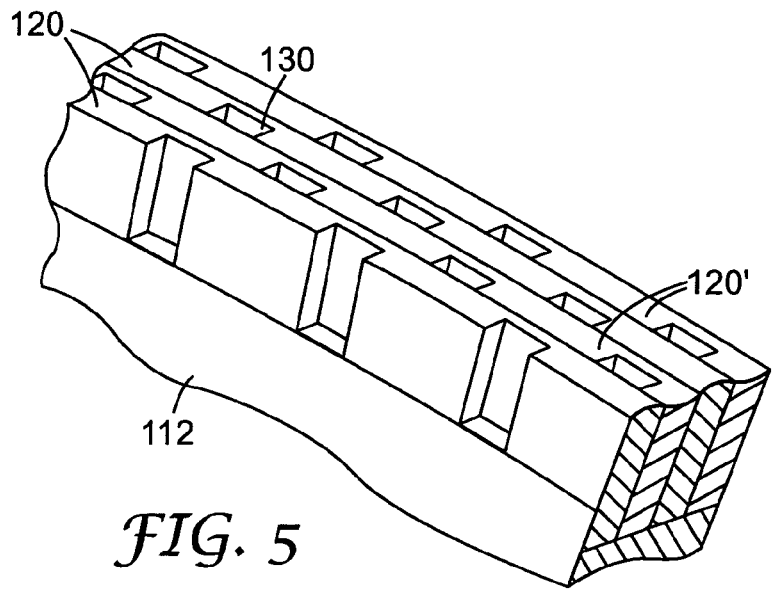
FIG. 5 is an enlarged cut-away perspective view of a portion of the surface of the tool roll of FIG. 4 illustrating the cavities formed therein.

FIGS. 4 and 5 depict another illustrative embodiment of a tool roll 110 including mold cavities 130 opening into an outer surface of the tool roll 110. The tool roll 110 preferably includes a cylindrical base roll 112 around which one or more wires are wrapped in the shape of a helical coil to produce a surface having a plurality of mold cavities 130 formed therein.

As best illustrated in FIG. 5, the surface of the tool roll 110 can be wound with two wires 120 and 120', each of the wires including depressions formed therein that, when wound together, form the mold cavities 130. One difference between the tool roll 110 and roll 10 is that instead of a spacer wire 40 with a substantially uniform cross-section, the roll 110 includes two wires that both include depressions formed therein. One advantage of the design of tool roll 110 is the ability to provide higher density mold cavities 130, i.e., reduced spacing between the mold cavities 130.

Although the illustrated tool roll 110 is preferably provided using two wires 120 and 120', it will be understood that the tool roll 110 could be produced using three or more wires. In yet another alternative, the tool roll 110 could be provided with a single wire in which case the reference numbers 120 and 120' would designate alternate windings or coils of the wire.

Figure 5A:
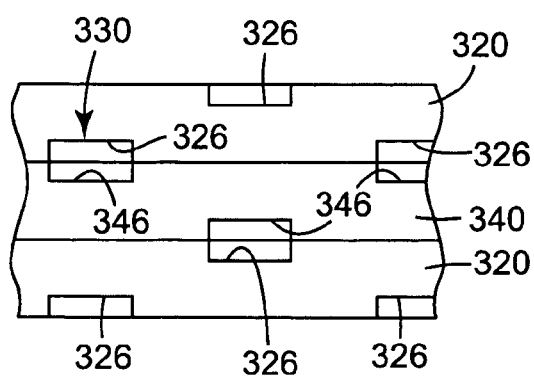
FIG. 5A is a plan view of another tool roll surface in which mold cavities are formed as composites of two depressions formed in wires facing each other.

Another tool roll variation is depicted in FIG. 5A, a plan view of one tool roll surface, in which mold cavities 330 are formed as composites of depressions 326 and 346 formed in two major sides of wires 320 and 340 that face each other when wound around the base roll (not shown). Although the depressions 326 and 346 facing each other are depicted as symmetrical, it should be understood that the depressions used to form the composite mold cavity 330 may be symmetrical or asymmetrical. By providing composite mold cavities formed by two or more depressions, it may be possible to provide cavities with shapes and/or dimensions that would otherwise be difficult to achieve by depressions formed in the side surface of only one wire.

FIGS. 6A–6E illustrate various shapes for depressions in the wires used in connection with the present invention that vary from the substantially uniform depressions discussed above. One advantage of the tool rolls according to the present invention is that the depressions can be formed with different shapes and/or orientations to provide mold cavities that also have different shapes and/or orientations. Further, wires used with the present invention may include more than one shape of depression such that finished films having complex patterns of protrusions may be produced. It will be understood that use of some of these mold cavities to produce a finished film with desired protrusions will depend on resin selections and process conditions.

Figure 6A:
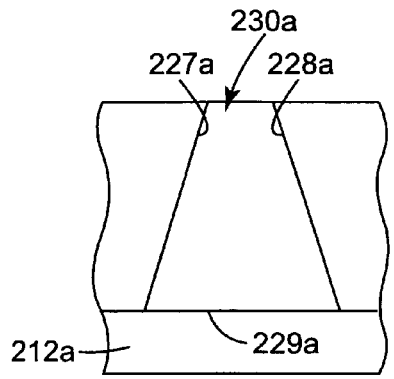
FIGS. 6A–6F illustrate a variety of mold cavity shapes.

The mold cavity 230a in FIG. 6A has a varying cross-sectional area that increases from the opening of the cavity 230a to the bottom 229a. The side walls 227a and 228a are diverging in that direction. As a result, the cavity 230a has a tangential cross-sectional area proximate the bottom 229a of the cavity 230a that is larger than the tangential cross-sectional area at the opening of the cavity 230a.

Figure 6B:
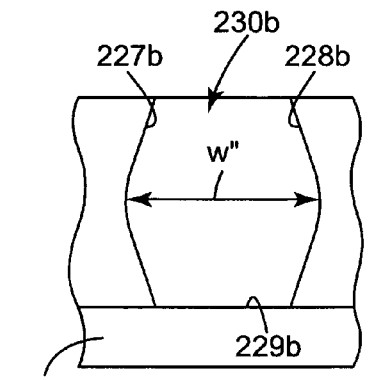
Figure 6C:
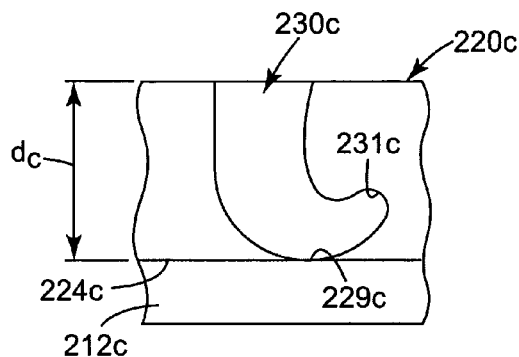

FIG. 6B depicts a mold cavity 230b in which the side walls 227b and 228b provide the cavity 230b with a varying width that reaches a maximum at some point between the opening of the cavity 230b and the bottom 229b of the cavity 230b. In the illustrated cavity 230b, the width w" is at a maximum near the midpoint of the depth of the cavity 230b. If the thickness of the wire in which the cavity 230b is formed is constant over the depth of the cavity, then the mold cavity 230b can be described as having a tangential cross-sectional area at its opening that is smaller than the tangential cross-sectional area of the cavity 230b at some point below its opening.

Figure 6D:
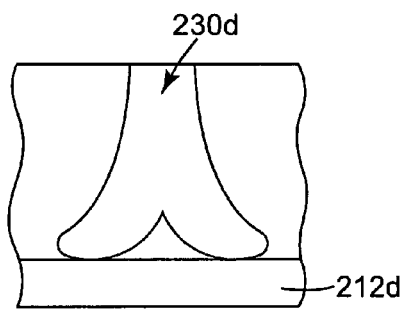

FIG. 6C depicts yet another variation in the shape of the mold cavities that can be provided in tool rolls of the present invention. The illustrated mold cavity 230c has a curved shape in the form of a hook. Mold cavities with that shape may be used to directly form hook strips without significant additional processing. FIG. 6D illustrates a mold cavity 230d including a double-ended hook shape that may also be molded by tool rolls according to the present invention.

Figure 6E:
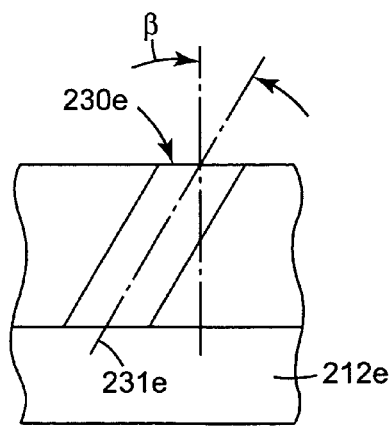

FIG. 6E depicts a variation in the orientation of mold cavities supplied in tool rolls according to the present invention. The mold cavity 230e is formed with an axis 231e that is oriented at an angle with respect to the radius r of the tool roll (not shown).

Figure 6F:
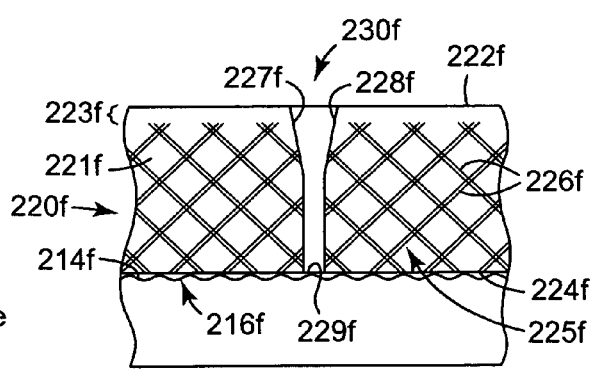

FIG. 6F depicts a mold cavity 230f in which the side walls 227f and 228f provide the cavity 230f with a varying width that tapers at some point between the opening of the cavity 230f and the bottom 229f of the cavity 230f. In other words, the cavity 230f can be described as having a tangential cross-sectional area at its opening that is larger at the opening than the tangential cross-sectional area of the cavity 230f then at some point below its opening; the cavity 230f narrows as the cavity 230f progresses from outer edge 222f of wire 220f to inner edge 224f.

The present invention may also include bleed structures formed in a surface of the wire or wires used to form the mold cavities. The bleed structures may allow fluid (e.g., air) to more readily escape from the mold cavities, thereby enhancing filling of the cavities. The bleed structures may be particularly helpful when the mold cavities have higher aspect ratios that could otherwise be difficult to fill completely.

It may be preferred that the bleed structures occupy only a portion of the surface of the wire such that an edge zone is provided proximate the outer surface of the tool roll. The edge zone is preferably free of the bleed structure to prevent undesired filling of the bleed structure by the moldable material during processing.

Furthermore, although the bleed structure is depicted in FIG. 6F as being formed in the same surface as the depression that forms mold cavity 230f, it should be understood that the bleed structure could alternatively be located on the surface that faces the depression forming mold cavity 230f. With respect to FIG. 2, a bleed structure could be located on the surface of the spacer wire 40 that faces the depressions 26. With respect to FIG. 5, a bleed structure could be formed in the opposite side of the wire 120 and 120' from the side in which the depressions forming mold cavities 130 are formed. In another alternative, a bleed structure could be provided on both of the surfaces used to define mold cavities in accordance with the principles of the present invention.

The depicted bleed structure 225f formed in the first major side 221f of wire 220f is a knurl pattern that essentially defines channels 226f that intersect sidewalls 227f and 228f of mold cavity 230f. It may be preferred that channels 226f are of a size such that significant amounts of moldable material may not be able to enter the bleed structure 225f. The bleed structure 225f may preferably extend to the inner edge 224f of wire 220f to provide pathways for fluid to exit the mold cavity 230f.

Further, it may be preferred that bleed structure 225f does not extend into an edge zone 223f proximate the outer edge 222f of the wire 220f. By providing an edge zone 223f free of the bleed structure 225f, the channels 226f do not form cavities with openings on the outer surface of the tool roll that may be filled with moldable material. In some instances, however, it may be possible to allow the bleed structure to extend to the outer edge 222f of the wire 220f where, for example, any openings thus formed are too small to significantly fill with moldable material or where any such filling is acceptable.

In addition to (or in place of) bleed structures formed on the wire or wires wound around a base roll, the surface of the tool roll around which the wire or wires are wound may also include a bleed structure to assist in the removal of air or other fluids from the mold cavities during processing. The bleed structure on the surface of the base roll may be used alone (without bleed structures on the wires) where the mold cavities include bottoms that are formed by the outer surface of the base roll itself, thereby placing the mold cavities in fluid communication with the bleed structure on base roll.

The outer surface 214f of the base roll 212f of FIG. 6F is depicted as including a bleed structure in the form or a randomly roughened surface (formed by, e.g., etching, sandblasting, etc.). The bleed structure of surface 214f may extend over the entire surface 214f of base roll 212f or it may be provided in only selected areas.

An additional advantage that may be provided by a base roll 212f including a bleed structure formed on its outer surface 214f is that may assist in holding wire 220f in place around the cylindrical base roll 212f by increasing frictional forces developed between the wire 220f and the base roll 212f.

The bleed structures used in connection with the present invention (on the wires or the base roll) may be formed using any suitable technique known in the art, e.g., knurling, stamping, embossing, engraving, conventional machining, laser machining, electronic discharge machining, water jet machining, etching, photolithography, etc. Further, although the depicted bleed structures are a knurl pattern and a roughened surface, a bleed structure according to the present invention may be formed by any suitable structure or surface treatment that can provide a path for fluid to move between two facing surfaces, e.g., channels, standoffs that create voids, roughened surfaces (formed by etching, sandblasting, etc.), and combinations thereof.

Figure 7A:
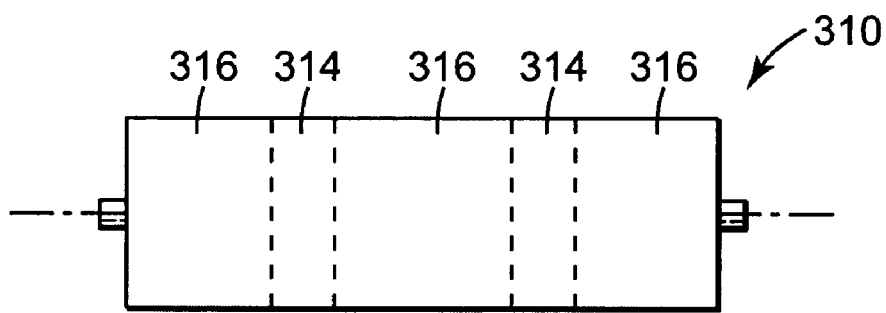
FIG. 7A is a plan view of a tool roll including circumferential areas with different mold cavities.

FIG. 7A illustrates a tool roll 310 in a plan view that includes areas 314 and 316 in which the mold cavities differ. In one example, areas 314 may be provided with mold cavities while areas 316 may be substantially free of mold cavities. In another example, the mold cavities in the different areas 314 and 316 may be different. The areas 314 and 316 on tool roll 310 are depicted as having a substantially uniform width and preferably also extend about the circumference of the roll 310.

Figure 7B:
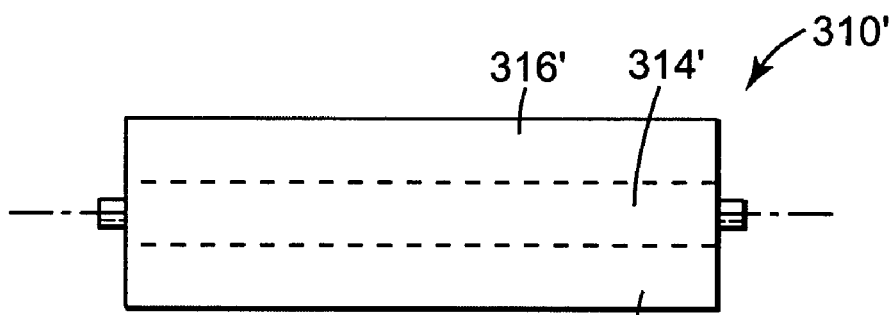
FIG. 7B is a plan view of a tool roll including a longitudinal area with different mold cavities.

Tool rolls according to the present invention may alternatively include areas in which the mold cavities differ that are not uniformly shaped and/or that do not extend around the circumference of the roll 310. One such variation is illustrated in FIG. 7B in which area 314' is oriented along the width of the tool roll 310' and surrounded on either side by areas 316'. As such, area 314' forms a longitudinal stripe along the roll 310'.

Figure 7C:
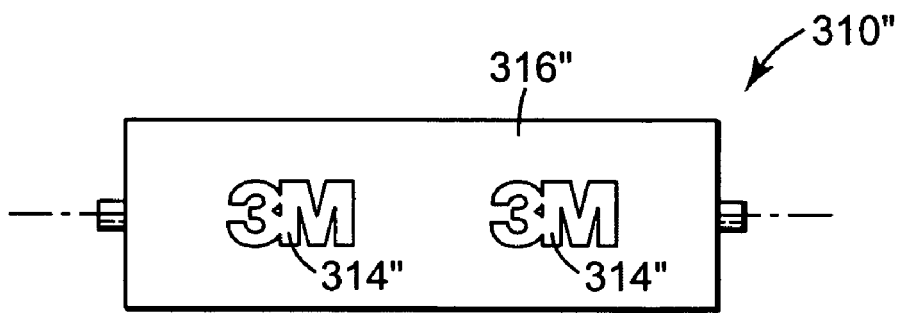
FIG. 7C is a plan view of a tool roll including a logo with different mold cavities in the area of the logo.

FIG. 7C illustrates another tool roll 310" that also includes areas 314" that have either no mold cavities or mold cavities that differ in some respect from the mold cavities in area 316". The areas 314" can take any shape, e.g., a logo as shown. Methods of manufacturing the tool roll 310" may include manufacturing a tool roll that includes uniformly shaped mold cavities distributed uniformly over its entire surface. After manufacturing the tool roll 310" with uniform mold cavities, one or more portions (e.g., areas 314") of the surface of the tool roll 310" can be masked while the other portion or portions (e.g., area 316") is processed to differentiate the mold cavities within the areas 314" from the mold cavities within the area 316". One method of processing the tool roll 310" could include, e.g., filling the mold cavities in the unmasked area either partially or completely. The materials used for filling could include solder, plastics, wax, etc. The materials used could be permanently located within the mold cavities or they may be removable to allow reuse of the tool roll with, e.g., a different logo.

FIGS. 8A–8D illustrate more variations in the wires used to form the mold cavities in the tool rolls of the present invention. The cross-sections are taken transverse to the lengths of the wires and, in FIG. 8A, the wire 420a is provided with a reverse L-shaped cross-section while the spacer wire 440a fits within the space formed between abutting wires 420a.

Figure 8A:
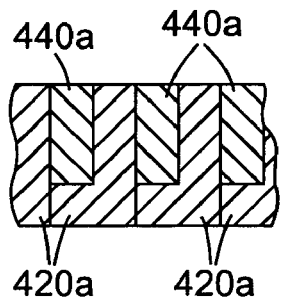
FIGS. 8A–8D illustrate different wire profiles for use in tool rolls according to the present invention.
Figure 8B:
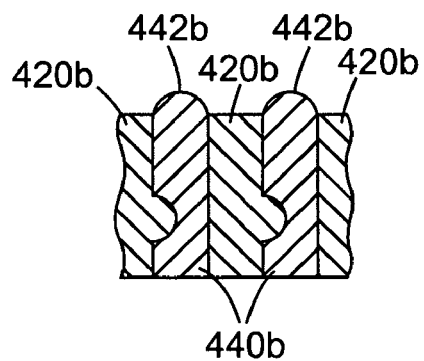

In FIG. 8B the wires 420b and 440b have mating profiles. In addition, wires 440b include a non-planar surface 442b that, in the illustrated embodiment, is a curved surface. Where the wires 420b include depressions that form the desired mold cavities (not shown), the addition of a curvature to the outer surface 442b of wires 440b may produce a corresponding fillet on two sides of the base of the each protrusion formed by the mold cavities. That fillet may improve the strength of the protrusion, i.e., increase its resistance to deflection. In addition, the curvature may also produce a ridged structure between protrusions that may impart additional rigidity to the film or article.

Figure 8C:
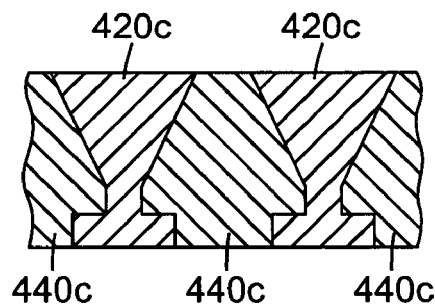
Figure 8D:
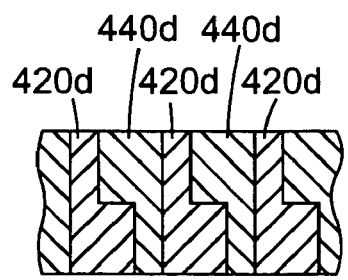

Wires 420c and 440c in FIG. 8C illustrate wires with mating profiles that also include tapered sides. FIG. 8D illustrates wires 420d and 440d that have nested profiles.

Using a wire or wires that include mating or nesting profiles as illustrated in FIGS. 8A–8D may improve the integrity of the windings on the base roll as the finished tool rolls are subjected to stresses during manufacture and use as a molding tool. Many other variations in the wire profiles may be envisioned within the scope of the present invention.

Figure 9:
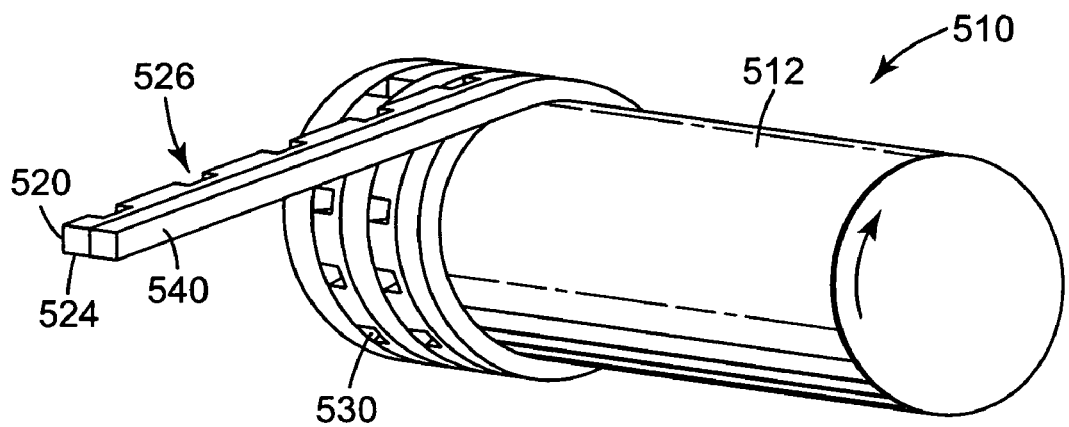
FIG. 9 illustrates one method of manufacturing a tool roll according to the present invention.

FIG. 9 illustrates one process of winding a base roll 512 with a wire 520 including depressions 526 and a spacer wire 540 to provide a tool roll 510 including mold cavities 530. It will be understood that more than two wires may be wound together if so desired.

In the methods of manufacturing tool rolls according to the present invention, it may be desirable to machine the outer surface of the tool roll 510 after winding the wires 520 and 540 to provide improved runout in the finished tool roll 510.

It may also be desirable to remove any burrs remaining from, e.g., wire punching and/or machining of the wound roll, by blasting the roll with sodium bicarbonate (baking soda) or a similar material. The finished tool roll 510 may also be processed to provide a desired surface finish within the mold cavities 530 and/or on the outer surface of the tool roll 510 between the mold cavities 530. For example, it may be desirable to chemically etch, sandblast, plate, coat or otherwise modify the surfaces of the tool roll 510.

Figure 10:
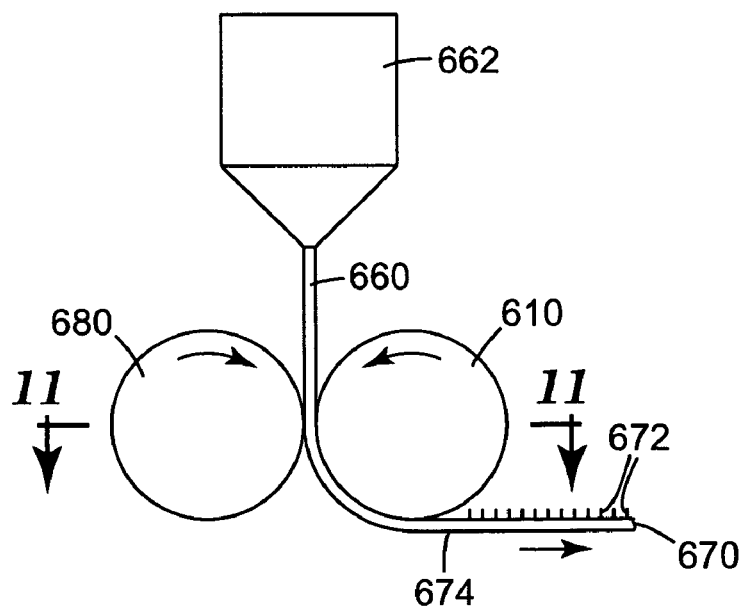
FIG. 10 illustrates one method of manufacturing a high aspect topology film using a tool roll according to the present invention.

FIG. 10 illustrates one process in which a tool roll 610 according to the present invention can be used to form a high aspect topology film. A moldable material 660 can be applied to the surface of the tool roll 610 by, e.g., extrusion or cast molding to create a film 670 including protrusions 672 that are replicas of the mold cavities in the tool roll 610. In preferred embodiments, adhesion of the material 660 to the tool roll 610 is less than the cohesion within the material 660 at the time of removal from the tool roll 610. It may be further preferred that the adhesion of the material 660 to the tool roll not exceed the tensile strength of the wire or wires used to form the tool roll 610.

Substantially any moldable material may be used in connection with the present invention. It may be preferred that the moldable material be an orientable thermoplastic resin. Orientable thermoplastic resins that can be extrusion molded and should be useful include polyesters such as poly(ethylene terephthalate), polyamides such as nylon, poly(styrene-acrylonitrile), poly(acrylonitrile-butadiene-styrene), polyolefins such as polypropylene, and plasticized polyvinyl chloride. One preferred thermoplastic resin is an impact copolymer of polypropylene and polyethylene containing 17.5% polyethylene and having a melt flow index of 30, that is available as SRD7-587 from Union Carbide, Danbury, Conn. The thermoplastic resin may also comprise blends, including polyethylene and polypropylene blends, co-polymers, such as polypropylene-polyethylene co-polymers, or coextruded as multiple layers or in alternating zones. Additives such as plasticizers, fillers, pigments, dyes, anti-oxidants, release agents, and the like may also be incorporated into the moldable material.

In one preferred process, the material 660 is provided by extrusion into a nip formed by the tool roll 610 and a backup roll 680. The backup roll 680 preferably provides some pressure to assist in forcing the moldable material 660 into the mold cavities 630 (see FIG. 11) provided in the tool roll 610. Alternatively, the backup roll 680 may be replaced by any continuously moving surface that can assist in forcing the mold material into the mold cavities in tool roll 610.

The interior of the tool roll 610 may be supplied with a vacuum to assist in removal of air that may otherwise interfere with complete filling of the mold cavities. However, in many instances, no vacuum may be supplied as the air within the mold cavities escapes between the wires used to manufacture the tool roll 610. In other words, the process may be performed in the absence of a vacuum.

It may also be desirable to provide some thermal control in either or both of the tool roll 610 and the backup roll 680. Depending on process conditions, temperatures of the moldable material 660, properties of the moldable material 660, etc. it may be desirable to either heat one or both of the rolls 610 and 680, cool one or both of the rolls 610 and 680, or heat one of the rolls and cool the other roll.

After the material 660 is forced within the mold cavities in tool roll 610 and has sufficiently cooled to form a film 670 with protrusions 672 that can maintain the desired shape or shapes, it is stripped from the tool roll 610 for further processing or the film 670 can be wound into rolls. For example, if mechanical fastener strips are desired, the film 674 may be directed into a station or stations to modify the protrusions, coat adhesives, and perform other processing as discussed in, e.g., U.S. Pat. No. 5,845,375 (Miller et al.), U.S. Pat. No. 5,077,870 (Melbye et al.), PCT Publication Nos. WO 98/57565; WO 98/57564; WO 98/30381; and WO 98/14086.

It may be desirable to direct one or more additional materials into the nip formed by the tool roll 610 and backup roll 680 to provide desired additional properties to the film 670. For example, a woven or nonwoven web may be directed into the nip. Alternatively, the film 670 may be laminated to one or more additional layers by, e.g., heat, adhesives, coextrusion, etc.

Figure 11:
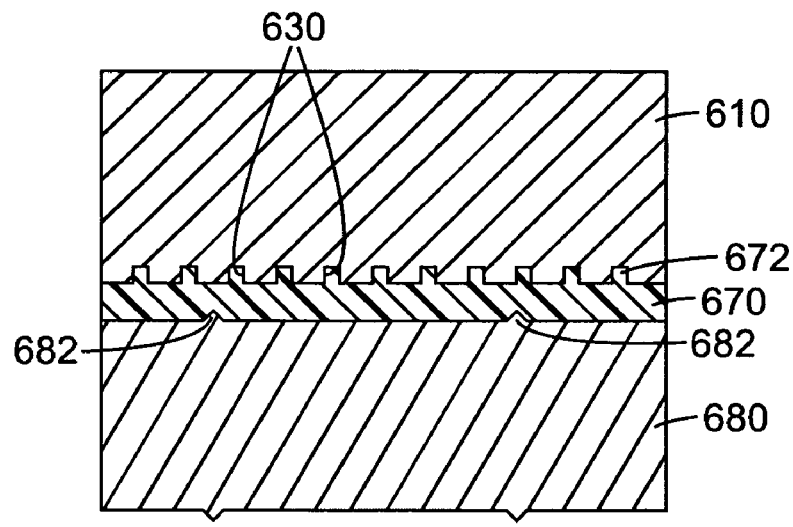
FIG. 11 is a cross-sectional view of the apparatus of FIG. 10, taken along line 11—11 in FIG. 10.

FIG. 11 is a cross-sectional view of the apparatus of FIG. 10 taken along line 11—11 in FIG. 10. The tool roll 610 includes mold cavities 630 filled by the moldable material to form protrusions 672 on film 670. Also illustrated in FIG. 11 are two raised structures 682 formed on the backup roll 680. One advantage of the raised structures 682 on the illustrated backup roll 680 is that each of the raised structures may create a line or zone of weakness along which the film 670 can be separated. The raised structures 682 are, however, optional and need not be provided in connection with the present invention.

Another optional feature that may be incorporated into the backup roll 680 is the addition of some structure to the surface of the roll 680 to increase its surface area. The increased surface area on the backup roll 680 can increase the surface area on the film 670, thereby improving adhesion of any adhesives provided on the back side 674 of the film 670. One example of useful structure could be a microembossed pattern of linear prisms on the scale of about 400 lines per inch (160 lines per centimeter).

Figure 12:
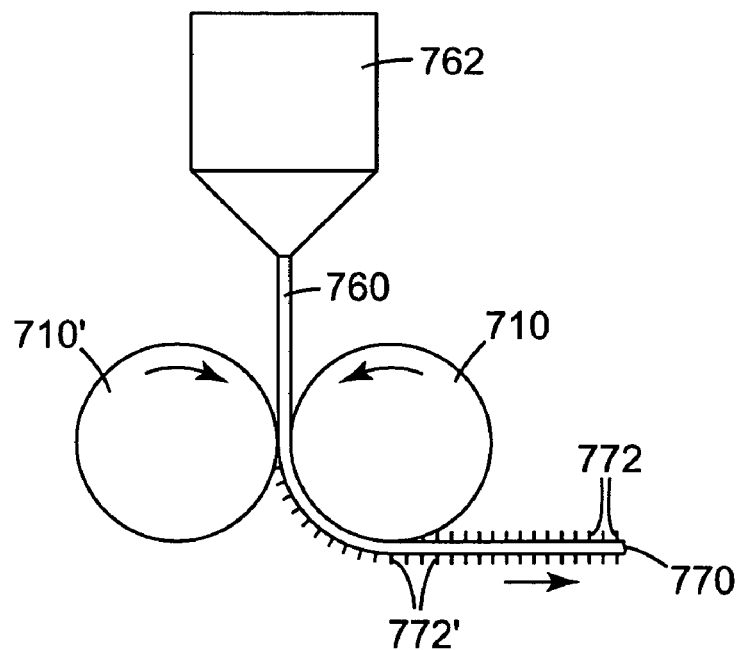
FIG. 12 illustrates one method of manufacturing a high aspect topology film including protrusions on both sides using two tool rolls according to the present invention.

FIG. 12 illustrates another process using wire-wound tool rolls with mold cavities formed therein. The illustrated process forms a film 770 having protrusions 772 extending from one side thereof and protrusions 772' extending from the opposite side of the film 770. The two-sided film 770 is formed by opposing tool rolls 710 and 710', both of which include mold cavities formed therein. The protrusions 772 and 772' may have the same characteristics in terms of size, shape, orientation, etc. or they may be different.

Figure 13:
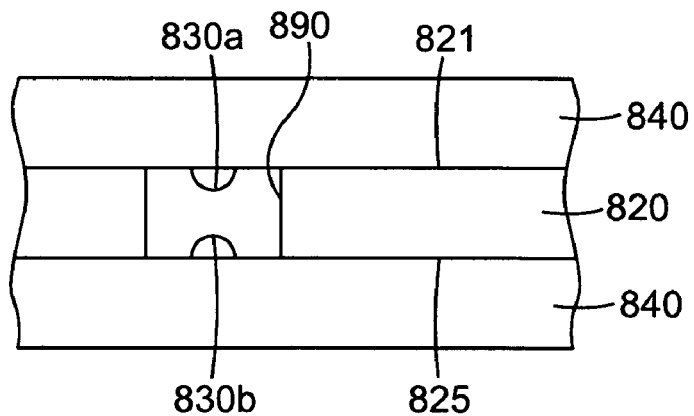
FIG. 13 is a plan view of another wire wound tool according to the present invention including composite mold cavities formed by voids and depressions in the same wire.
Figure 14:
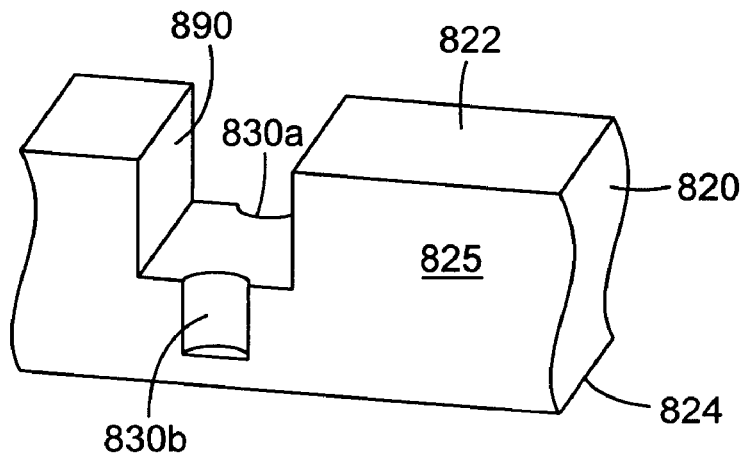
FIG. 14 is a perspective view of wire 820 from FIG. 13, depicting a void and depressions formed therein.

FIGS. 13 & 14 depict still another embodiment of a tool roll that may be provided in connection with the present invention. FIG. 13 is a plan view of a portion of a tool roll formed by wrapping wires 820 and 840 in a helical pattern about the surface of a base roll. Although the tool roll may include different wires 820 and 840, only a single wire could be provided, in which case the reference numbers 820 and 840 would designate alternate windings or coils of the wire. Further, more than two wires could be wound around a tool roll in accordance with the present invention.

In the depicted embodiment, wire 820 includes a plurality of voids 890 formed through both of its major sides 821 and 825 (although only one such void is depicted in FIG. 13), the void 890 also taking a portion of the outer edge 822 of the wire 820. The void 890 does not, however, extend to the inner edge 824 of the wire 820. In addition to the void 890, depressions 830a and 830b are also formed in the major sides 821 and 825 of the wire 820. The depressions 830a and 830b open into the void 890. The void 890 and the depressions 830a and 830b may together provide a composite mold cavity with a shape that could not be achieved with a void alone or with only depressions.

A tool roll formed using wires 820 and 840 will include a plurality of composite mold cavities formed therein. Furthermore, it will be understood that each void 890 may be provided in connection with only one depression or more than two depressions if so desired, i.e., the composite mold cavities are not to be limited to structures formed by a void in combination with two depressions.

Figure 15:
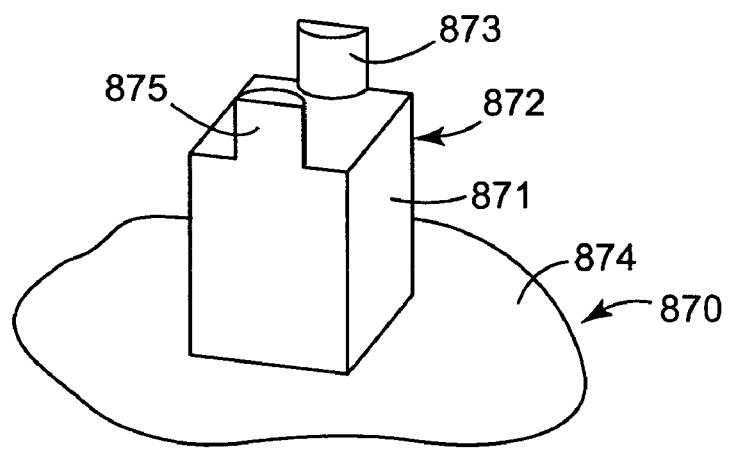
FIG. 15 is a perspective view of one protrusion formed by the composite mold cavity of FIG. 13.

FIG. 15 is a perspective view of a protrusion 872 that may be formed using the composite mold cavity depicted in FIGS. 13 & 14. The protrusion 872 includes a stem 871 protruding from a surface 874 of article 870. The stem 871 is formed primarily by the void 890 formed in wire 820. A pair of ears 873 and 875 extend from the stem 871. The ears 873 and 875 are formed primarily by the depressions 830a and 830b in wire 820 as described above.

Figure 16:
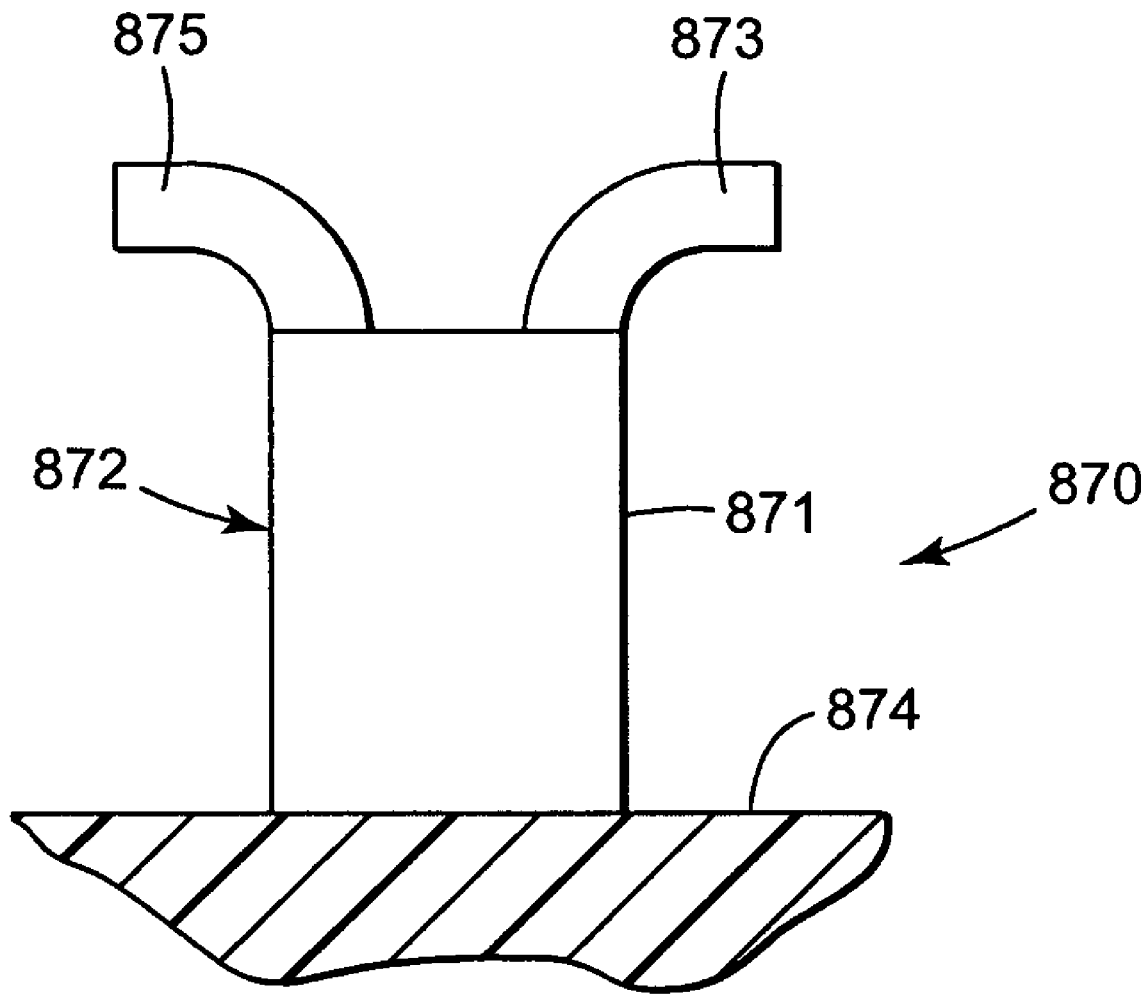
FIG. 16 is a side view of the protrusion of FIG. 15 after processing.

In some instances, protrusions 872 may be useful in their as-formed shape seen in FIG. 15. In other instances, however, it may be advantageous to modify the shape of the protrusion 872 from its originally-formed shape. One such modification is depicted in FIG. 16 where the protrusion 872 is depicted as extending from surface 874 of article 870. The stem 871 remains essentially unchanged, but the ears 873 and 875 have been modified such that they no longer stand vertically relative to the localized plane defined by surface 874. Rather, the ears 873 and 875 have been processed such that they extend horizontally relative to the localized plane defined by surface 874. In this configuration, the protrusion 872 may be useful as, e.g., a mechanical fastener with ears 873 & 875 serving as hooks that may engage a complementary structure (e.g., a loop structure). Examples of processes that may be used to accomplish this change include, e.g., the application of heat or the application of heat and mechanical pressure.

Figure 17:
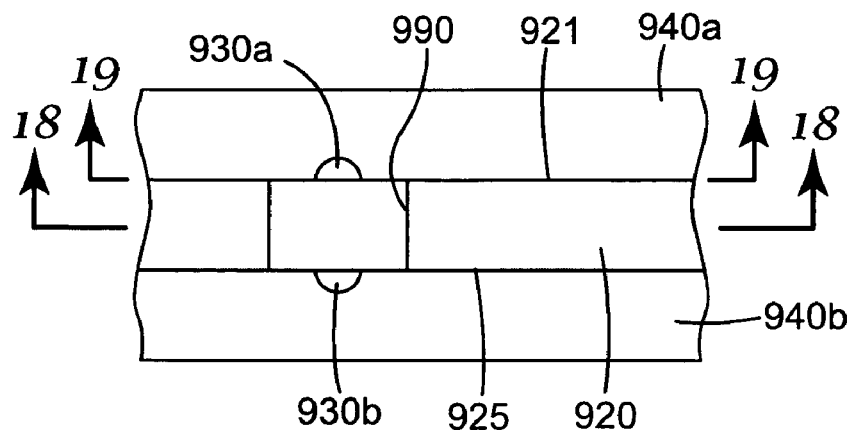
FIG. 17 is a plan view of another wire wound tool according to the present invention including composite mold cavities formed by voids and depressions in different wires.
Figure 18:
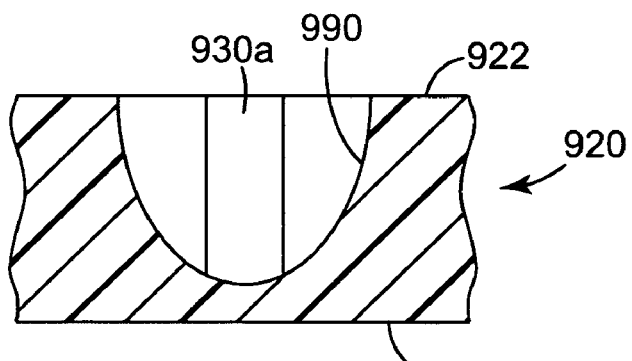
Figure 19:
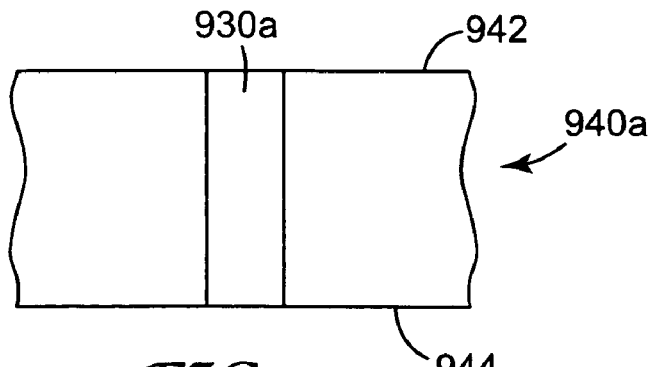
FIG. 19 is a cross-sectional view of FIG. 17 taken along line 19—19, depicting a major side of wire 940a and a depression formed therein.

FIGS. 17–19 depict another embodiment of a tool roll including composite mold cavities formed by voids and depressions in wires. The structure depicted in FIG. 17 includes wires 920 and 940 that may be the same or different wires as described above with respect to FIG. 13. The wire 920 includes a plurality of voids 990 formed through its two major sides 921 and 925 (although only one such void is depicted in the view of FIG. 17). A view of one major side of wire 940a is depicted in FIG. 19, illustrating that the depression formed extends from outer edge 942 to inner edge 944 (the edge that is wound against the surface of a base roll (not shown). Alternatively, the depression 930a may not extend from the outer edge 942 to the inner edge 944 of wire 940a.

One variation from the structure of FIG. 13 is that the wires 940 include depressions 930a and 930b formed in their respective major sides, such that the depressions 930a and 930b face the major sides of wire 920. This differs from the structures seen in FIGS. 13 & 14, in which both the void 890 and depressions 830a and 830b are formed in the wire 820, with wires 840 having generally flat sides (although they may include bleed structures as discussed herein).

It may be preferred that the depressions 930a and 930b intersect with the void 990 as seen in FIG. 17 such that the depressions 930a and 930b form a composite mold cavity including the volumes defined by the void 990 in wire 920 and the depressions 930a and 930b in wires 940. Further, although only one composite mold cavity is depicted in FIG. 17, it will be understood that tool rolls manufactured using wires 920 and 940 will include a plurality of composite mold cavities dispersed over the surface of the roll.

Figure 20:
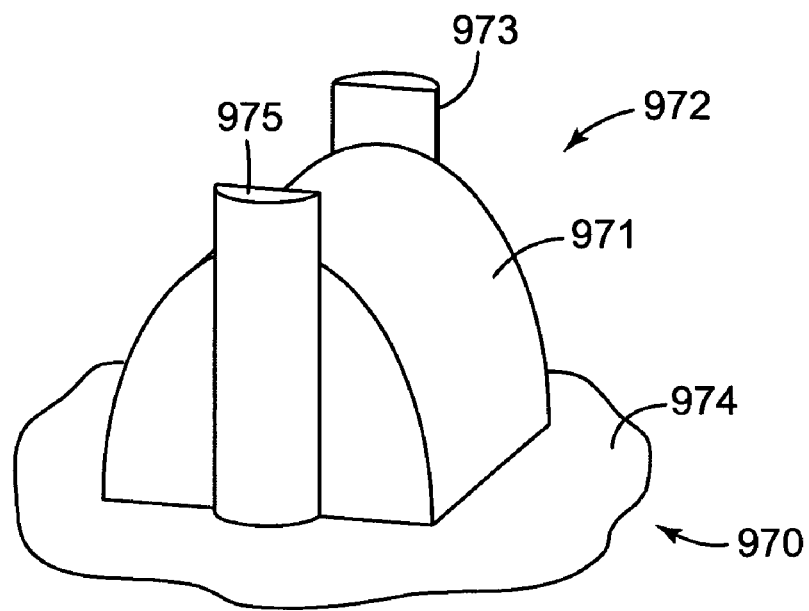
FIG. 20 is a perspective view of one protrusion formed by the composite mold cavity of FIG. 17.

FIG. 20 is a perspective view of a protrusion 972 that may be formed using the composite mold cavity depicted in FIGS. 17 & 18. The protrusion 972 includes a stem 971 protruding from a surface 974 of article 970. The stem 971 is formed primarily by the void 990 formed in wire 920. A pair of ribs 973 and 975 extend along opposite sides of the stem 971 and extend past the height of the stem 971. The ribs 973 and 975 are formed primarily by the depressions 930a and 930b in wires 940a and 940b (respectively) as described above.

Figure 21:
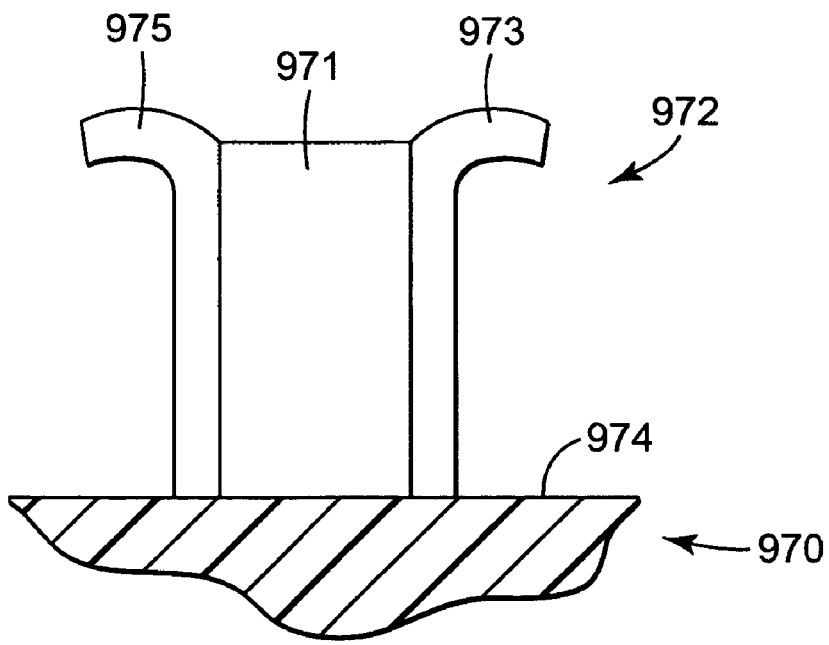
FIG. 21 is a side view of the protrusion of FIG. 20 after processing.

In some instances, protrusions 972 may be useful in their as-formed shape seen in FIG. 20. For example, the ribs 973 and 974 may enhance the rigidity or structural integrity of the protrusion 972. In other instances, however, it may be advantageous to modify the shape of the protrusion 972 from its originally-formed shape. One such modification is depicted in FIG. 21 where the stem 971 of protrusion 972 remains essentially unchanged, but the portions of the ribs 973 and 975 that extend past the stem 971 have been modified such that they no longer stand vertically relative to the localized plane defined by surface 974. Rather, the ribs 973 and 975 have been processed such that they extend horizontally relative to the localized plane defined by surface 974. In this configuration, the protrusion 972 may be useful as, e.g., a mechanical fastener with the portions of the ribs 973 & 975 extending from the stem 971 serving as hooks that may engage a complementary structure (e.g., a loop structure). Examples of processes that may be used to accomplish this change include, e.g., the application of heat or the application f heat and mechanical pressure.

Figure 22:
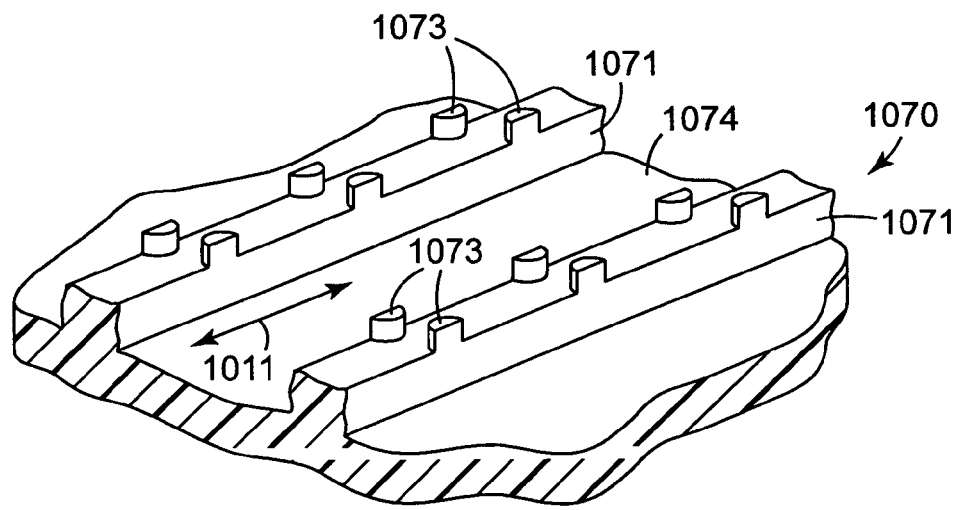
FIG. 22 is a perspective view of a portion of one article according to the present invention.

FIG. 22 is a perspective view of another article 1070 of the present invention including protrusions formed of ridge 1071 extending from a surface 1074 of the article 1070. Each of the ridges 1071 includes a plurality of ears 1073 protruding therefrom. In some instances, the ears 1073 may be useful in their as-formed shape seen in FIG. 22. In other instances, however, it may be advantageous to modify the shape of the ears 1073 as depicted and described with respect to, e.g., FIGS. 16 & 21. The ridge 1071 of each protrusion may preferably have a length (in direction 1011) that is coextensive with the length of the article 1070 in direction 1011. Alternatively, the ridge 1071 of each protrusion may have a length shorter than that of article 1070. The length of each ridge 1071 in direction 1011 may preferably be greater than its width (measured transverse to direction 1011), e.g., it may be preferred that the length of the ridge 1071 be at least two or more times the width of the base 1071. Furthermore, it may be preferred that the elongated ridges 1071 be aligned with each other along a common direction, e.g., direction 1011 in FIG. 22.

Figure 23:
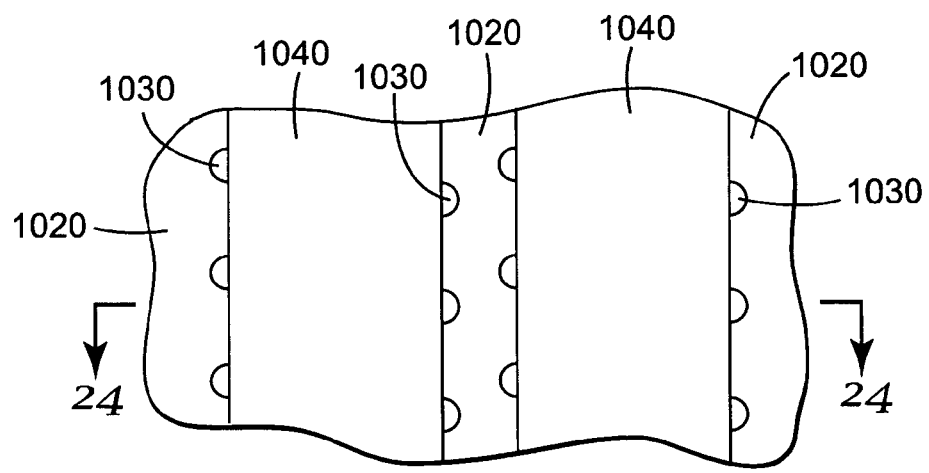
FIG. 23 is a plan view of a portion of one tool roll that can be used to manufacture the article of FIG. 22.
Figure 24:
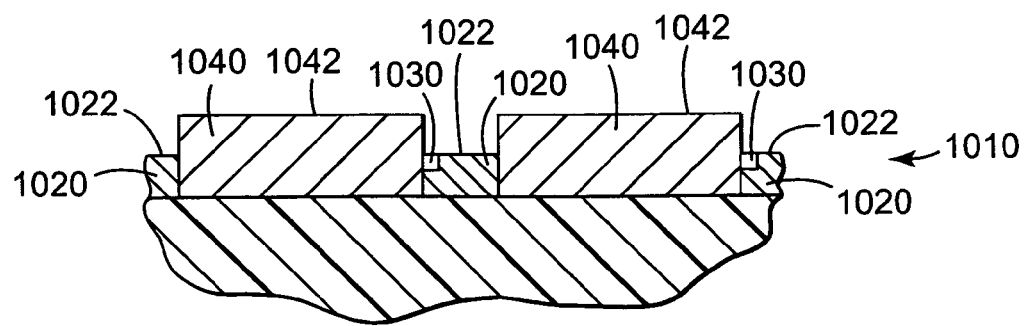
FIG. 24 is a cross-sectional view of the tool roll of FIG. 23 taken along line 24—24 in FIG. 23.

FIG. 23 is a plan view of a portion of a tool roll 1010 and FIG. 24 is an enlarged cross-sectional view of the tool roll 1010 taken along line 24—24 in FIG. 23. The tool roll 1010 may be used to manufacture an article such as that depicted in FIG. 22. Tool roll 1010 is formed by wires 1020 and 1040 that are helically wound around a base roll 1012. Wire 1020 has an outer edge 1022 with a height above the base roll 1012 that is less than the height of the outer edge 1042 of the wire 1040, resulting in a tool roll 1010 on which grooves are formed between windings of wire 1040. The grooves formed between windings of wires 1040 provide the mold cavities in which ridges 1071 of article 1070 can be formed when tool roll 1010 is contacted by moldable material. Although wires 1020 and 1040 are disclosed as having generally rectangular profiles, they could alternately be provided with a different shape, in which case the ridges 1071 of article 1070 would also be formed with a different shape than that illustrated in FIG. 22.

Also seen in FIGS. 23 and 24 are depressions 1030 formed in wires 1020. The depressions 1030 fill with moldable material to form ears 1073 on ridges 1071 as seen in FIG. 22. Although depressions 1030 are shown only in wire 1020, it will be understood that depressions may be provided in either wire 1020, wire 1040, or both wire 1020 and wire 1040. Although not seen in FIGS. 23 and 24, one or both of wires 1020 and 1040 may preferably include bleed structures as described herein.

Figure 25:
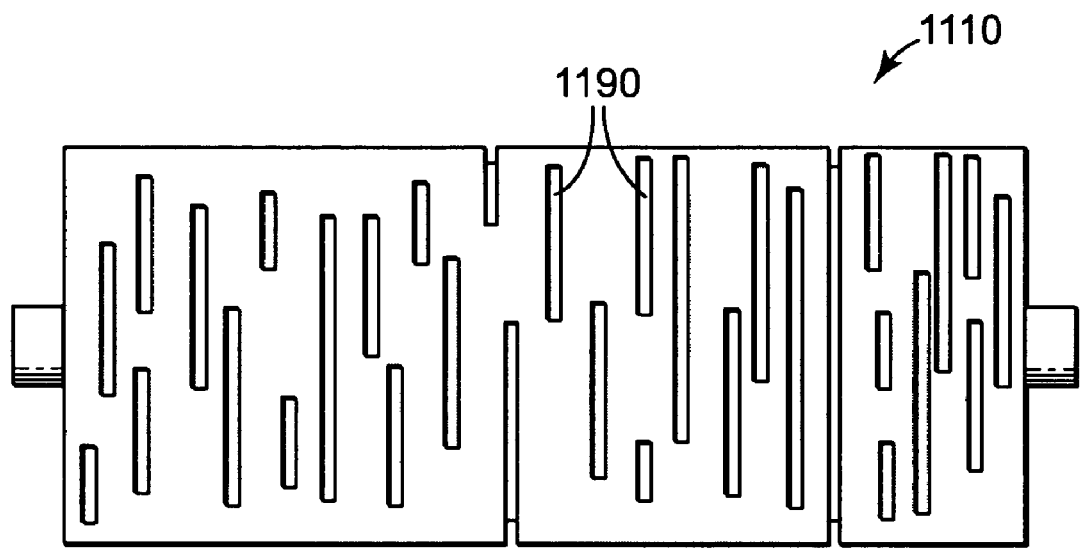
FIG. 25 depicts a tool roll with discontinuous helical grooves formed in its outer surface.

Although the grooves formed by the wires 1020 and 1040 wrapped around the tool roll 1010 may be continuous around the circumference of the roll 1010, they may also be discontinuous. FIG. 25 depicts a tool roll 1110 including grooves 1190 that extend for some length around the tool roll 1110, but are not formed in a continuous helical groove. The elongated grooves 1190 can, e.g., be formed by wires including voids formed therein as discussed above with respect to, e.g., FIGS. 13 & 14. The voids in the wires used in tool roll 1110 will, however, typically extend for longer distances over the length of the wires.

These elongated voids may be uniformly sized and spaced as depicted in the tool rolls above, or they may be non-uniformly sized and non-uniformly spaced. Tool roll 1110 illustrates wires with non-uniformly sized and spaced voids that, when wrapped around a base roll, form non-uniformly sized and spaced grooves 1190.

Figure 26:
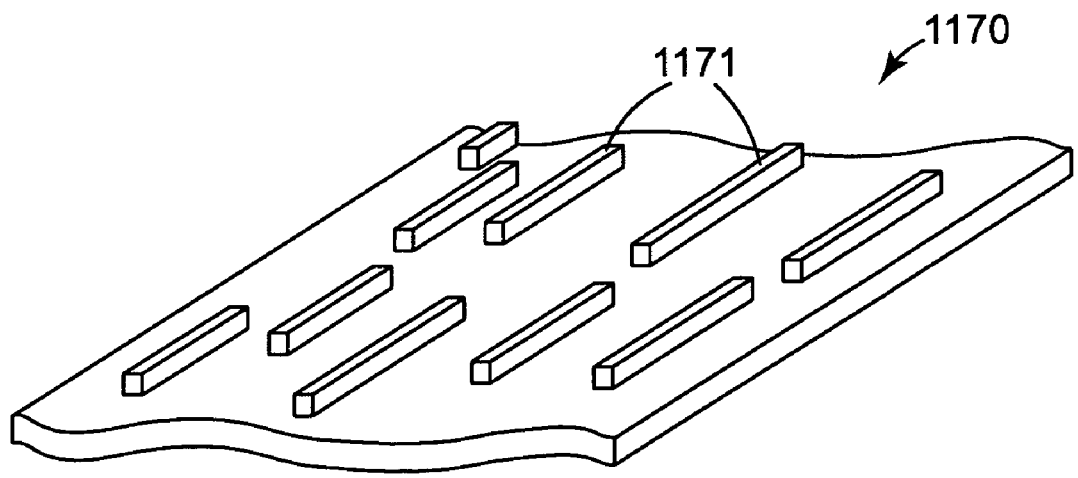
FIG. 26 is perspective view of an article manufactured using the tool roll of FIG. 25.

The articles produced by a tool roll such as tool roll 1110 will include elongated ridges 1171 as illustrated in FIG. 26. The ridges 1171 preferably include protrusions (not shown) formed thereon such as those depicted in connection with FIGS. 15, 20, and 22. Because the grooves 1190 in tool roll 1110 are non-uniformly sized and spaced, the elongated ridges 1171 on article 1170 are also non-uniformly sized and spaced.

All patents, patent applications, and publications cited herein are each incorporated herein by reference in their entirety, as if individually incorporated by reference. Various modifications and alterations of this invention will become apparent to those skilled in the art without departing from the scope of this invention, and it should be understood that this invention is not to be unduly limited to the illustrative embodiments set forth herein.

What is claimed is:

1. A method of forming a structured surface on an article, the method comprising:

providing a tool roll comprising a cylindrical base roll, a first wire comprising an inner edge, outer edge, and first and second major sides located therebetween, wherein the first major side comprises a plurality of depressions formed therein, and wherein the first wire is wound in helical coils around the base roll such that the inner edge is proximate the base roll, wherein the plurality of depressions in the first major side of the first wire form a plurality of mold cavities with each of the mold cavities comprising a mold opening at an outer surface of the tool roll proximate the outer edge of the first wire;

contacting a moldable material to the outer surface of the tool roll to form the structured surface using the outer surface of the tool roll, wherein the moldable material at least partially fills at least some of the mold cavities; and removing the structured surface from the outer surface of the tool roll, wherein the structured surface comprises a plurality of protrusions corresponding to the plurality of mold cavities.

2. The method of claim 1, further comprising a bleed structure formed in the first major side of the first wire, wherein at least some air in at least some of the mold cavities passes through the bleed structure when the moldable material at least partially fills at least some of the mold cavities.

3. The method of claim 2, wherein the first major side of the first wire comprises an edge zone free of the bleed structure.

4. The method of claim 2, wherein the base roll comprises a bleed structure formed in an outer surface of the base roll, wherein the first wire is located over the bleed structure, and wherein at least some air in at least some of the mold cavities passes through the bleed structure when the moldable material at least partially fills at least some of the mold cavities.

5. A method of forming a structured surface on an article, the method comprising:

providing a tool roll comprising a cylindrical base roll, a first wire comprising an inner edge, outer edge, and first and second major sides located therebetween, wherein the first wire is wound in helical coils around the base roll such that the inner edge is proximate the base roll, a plurality of depressions formed in the first major side of the first wire, a plurality of voids formed through the first and second major sides of the first wire, wherein each of the voids comprises a depression extending therefrom, wherein the plurality of voids with depressions extending therefrom form a plurality of composite mold cavities with each of the composite mold cavities comprising a mold opening at an outer surface of the tool roll proximate the outer edge of the first wire;

contacting a moldable material to the outer surface of the tool roll to form the structured surface using the outer surface of the tool roll, wherein the moldable material at least partially fills at least some of the composite mold cavities; and removing the structured surface from the outer surface of the tool roll, wherein the structured surface comprises a plurality of protrusions corresponding to the plurality of composite mold cavities.

6. The method of claim 5, further comprising a bleed structure formed in at least one of the first major side and the second major side of the first wire, wherein at least some air in at least some of the mold cavities passes through the bleed structure when the moldable material at least partially fills at least some of the mold cavities.

7. The method of claim 6, wherein the first wire comprises an edge zone proximate the outer edge of the first wire, wherein the edge zone is free of the bleed structure.

8. The method of claim 5, wherein the base roll comprises a bleed structure formed in an outer surface of the base roll, wherein the first wire is located over the bleed structure, and wherein at least some air in at least some of the mold cavities passes through the bleed structure when the moldable material at least partially fills at least some of the mold cavities.

* * * * *